(12) United States Patent
Hattanda et al.

(10) Patent No.: US 10,365,871 B2
(45) Date of Patent: Jul. 30, 2019

(54) INFORMATION TERMINAL APPARATUS, INFORMATION PROCESSING SYSTEM, AND INFORMATION PROCESSING METHOD

(71) Applicant: Oki Data Corporation, Minato-ku, Tokyo (JP)

(72) Inventors: Shunsuke Hattanda, Tokyo (JP); Hirohito Okazaki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/869,797

(22) Filed: Jan. 12, 2018

(65) Prior Publication Data

US 2018/0210688 A1     Jul. 26, 2018

(30) Foreign Application Priority Data

Jan. 23, 2017  (JP) ................. 2017-009177
Nov. 27, 2017  (JP) ................. 2017-226858

(51) Int. Cl.
*G06F 3/12* (2006.01)
*H04N 1/32* (2006.01)
*H04N 1/00* (2006.01)

(52) U.S. Cl.
CPC .......... *G06F 3/1265* (2013.01); *G06F 3/1204* (2013.01); *G06F 3/126* (2013.01); *G06F 3/1226* (2013.01); *G06F 3/1292* (2013.01); *H04N 1/00307* (2013.01); *H04N 1/00315* (2013.01); *H04N 1/32122* (2013.01);

(Continued)

(58) Field of Classification Search
CPC .... G06F 3/1265; G06F 3/1226; G06F 3/1292; H04N 1/00307; H04N 1/00315; H04N 1/32122; H04N 1/32523; H04N 2201/3205
See application file for complete search history.

(56) References Cited

U.S. PATENT DOCUMENTS

2005/0195434 A1* 9/2005 Ohara ................... G06F 3/1204
                                                                  358/1.16
2012/0243045 A1* 9/2012 Sato ...................... G06F 3/1204
                                                                  358/1.15
(Continued)

FOREIGN PATENT DOCUMENTS

JP        2003345579 A    12/2003

*Primary Examiner* — Moustapha Diaby
(74) *Attorney, Agent, or Firm* — Panitch Schwarze Belisando & Nadel, LLP

(57) ABSTRACT

An information terminal apparatus includes an associating processor, a process execution circuitry, a base detector, and a controller. The associating processor associates each of connection bases with both base identification information and limitation information regarding a data process. The base identification information identifies corresponding one of the connection bases. The process execution circuitry causes an information processing apparatus to execute the data process. The information processing apparatus is connected to at least one of the connection bases. The base detector detects that any of the connection bases becomes a connectable base. The controller causes, when the connectable base is detected by the base detector, the information processing apparatus connected to the connectable base to perform the data process based on the limitation information.

14 Claims, 22 Drawing Sheets

(52) U.S. Cl.
CPC . *H04N 1/32523* (2013.01); *H04N 2201/3205* (2013.01); *H04N 2201/3249* (2013.01)

(56) References Cited

U.S. PATENT DOCUMENTS

| | | | |
|---|---|---|---|
| 2013/0077568 A1* | 3/2013 | Mizutani | H04W 48/20 370/328 |
| 2015/0193674 A1* | 7/2015 | Ishiguro | G06F 3/1292 358/1.15 |
| 2016/0080585 A1* | 3/2016 | Kobayashi | H04N 1/00204 358/1.15 |
| 2017/0038923 A1* | 2/2017 | Tsuzuki | G06F 3/0482 |
| 2017/0123739 A1* | 5/2017 | Konji | G06F 3/1236 |

* cited by examiner

INFORMATION TERMINAL APPARATUS, INFORMATION PROCESSING SYSTEM, AND INFORMATION PROCESSING METHOD

CROSS REFERENCE TO RELATED APPLICATIONS

The present application claims priority from Japanese Patent Application No. 2017-009177 filed on Jan. 23, 2017 and No. 2017-226858 filed on Nov. 27, 2017, the entire contents of each which are hereby incorporated by reference.

BACKGROUND

The technology relates to an information terminal apparatus, an information processing system, and an information processing method.

There has been an information processing system including an information processing apparatus and an information terminal apparatus that transmits information to the information processing apparatus. One example thereof is a printing system. In the example case of the printing system, an image forming apparatus serves as the information processing apparatus. The printing system involves transmission of information instructing printing from the information terminal apparatus to the image forming apparatus. In a specific but non-limiting example of such a printing system, in order to print contents from the information terminal apparatus, only a uniform resource locator (URL) of the contents is transmitted from the information terminal apparatus to the image forming apparatus by means of near field communication. Thereafter, the image forming apparatus downloads the contents at the URL to thereby print the contents. Such a technique is disclosed in Japanese Unexamined Patent Application Publication No. 2003-345579, for example.

SUMMARY

In a printing system in which only a URL of contents is transmitted from an information terminal apparatus to an image forming apparatus by means of near field communication, and the image forming apparatus thereafter downloads the contents at the URL to thereby print the contents, it is necessary for a user to come close to the image forming apparatus and transmit the URL to the image forming apparatus. Therefore, the user may forget to print the contents, for example, in a case where there is a time lag between a time when the user comes up with the idea of printing the contents and a time when the user moves into an environment that allows for actual printing of the contents.

It is desirable to provide an information terminal apparatus, an information processing system, and an information processing method that allow for information processing with high usability.

According to one embodiment of the technology, there is provided an information terminal apparatus including an associating processor, a process execution circuitry, a base detector, and a controller. The associating processor associates each of connection bases with both base identification information and limitation information regarding a data process. The base identification information identifies corresponding one of the connection bases. The process execution circuitry causes an information processing apparatus to execute the data process. The information processing apparatus is connected to at least one of the connection bases. The base detector detects that any of the connection bases becomes a connectable base. The controller causes, when the connectable base is detected by the base detector, the information processing apparatus connected to the connectable base to perform the data process based on the limitation information.

According to one embodiment of the technology, there is provided an information processing system including an information processing apparatus and an information terminal apparatus that causes the information processing apparatus to perform a data process. The information terminal apparatus includes an associating processor, a process execution circuitry, a base detector, and a controller. The associating processor associates each of connection bases with both base identification information and limitation information regarding the data process. The base identification information identifies corresponding one of the connection bases. The process execution circuitry causes the information processing apparatus to execute the data process. The information processing apparatus is connected to at least one of the connection bases. The base detector detects that any of the connection bases becomes a connectable base. The controller causes, when the connectable base is detected by the base detector, the information processing apparatus connected to the connectable base to perform the data process based on the limitation information.

According to one embodiment of the technology, there is provided an information processing method including: causing an information terminal apparatus to associate each of connection bases with both base identification information and limitation information regarding a data process, the base identification information identifying corresponding one of the connection bases: causing the information terminal apparatus to detect that any of the connection bases becomes a connectable base; causing the information terminal apparatus to suspend the data process which is caused to be executed by an information processing apparatus, the information processing apparatus being connected to at least one of the connection bases; and causing, when the connectable base is detected, the information processing apparatus connected to the connectable base to perform the data process based on the limitation information.

DETAILED DESCRIPTION

Figure 1:
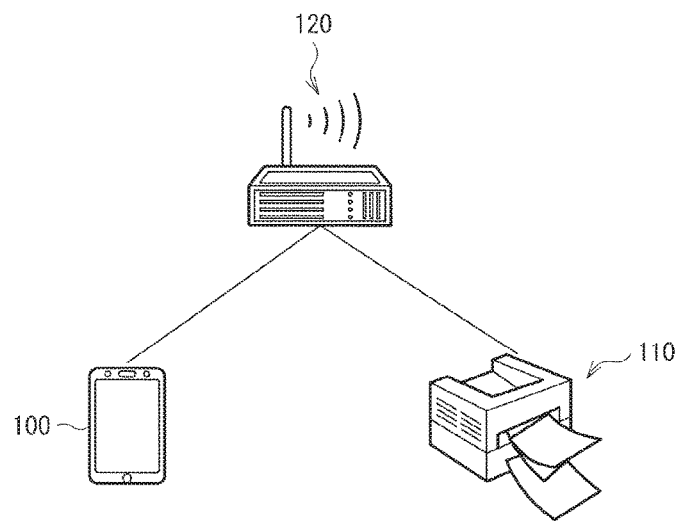
FIG. 1 is a configuration diagram illustrating an example of an outline of an information processing system according to a first example embodiment of the technology.

Some example embodiments of the technology are described in detail below in the following order with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Note that the like elements are denoted with the same reference numerals, and any redundant description thereof will not be described in detail.

1. First Example Embodiment
    1.1 Configuration
    1.2 Operation
    1.3 Effects
2. Second Example Embodiment
    2.1 Configuration
    2.2 Operation
    2.3 Effects
3. Third Example Embodiment
    3.1 Configuration
    3.2 Operation
    3.3 Effects
4. Fourth Example Embodiment
    4.1 Configuration
    4.2 Operation
    4.3 Effects
5. Fifth example embodiment
    5.1 Configuration
    5.2 Operation
    5.3 Effects
6. Sixth Example Embodiment
    6.1 Configuration
    6.2 Operation
    6.3 Effects
7. Seventh Example Embodiment
    7.1 Configuration
    7.2 Operation
    7.3 Effects
8. Other Example Embodiments

[1. First Example Embodiment]
[1.1 Configuration]

FIG. 1 illustrates an example of an outline configuration of an information processing system according to a first example embodiment of the technology.

The first example embodiment relates to the information processing system including an information processing apparatus and an information terminal apparatus that transmits information, e.g., data of a data process, to the information processing apparatus. As one non-limiting example of the information processing system, a description is given below of an image forming system, i.e., a printing system, including an image forming apparatus 110 and a mobile information terminal 100, as illustrated in FIG. 1. The information forming apparatus 110 may serve as the information processing apparatus. The mobile information terminal 100 may serve as the information terminal apparatus. Further, the description below refers to an example case involving a printing job, i.e., print data, and a printing process. The printing job, i.e., the print data, may be one non-limiting example of the data of the data process involved in the information processing system, and the printing process may be performed as one non-limiting example of the data process. Further, the description below refers to an example case including a private network as one non-limiting example of a connection base to which the information terminal apparatus is connected. Non-limiting examples of the private network may include a local area network (LAN).

The mobile information terminal 100 may be, for example but not limited to, a mobile device such as a tablet terminal or a smartphone. The mobile information terminal 100 and the image forming apparatus 110 may be connected to each other by means of a wireless LAN router 120, and thereby be able to perform mutual communication with each other.

Figure 2:
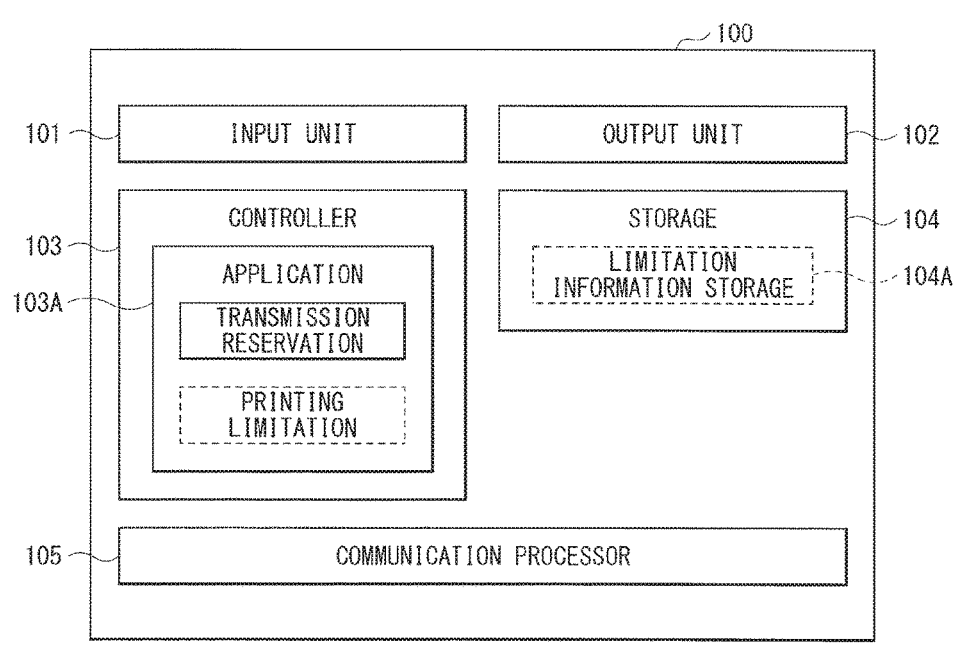
FIG. 2 is a block diagram illustrating an example of an internal configuration of a mobile information terminal according to the first example embodiment.

FIG. 2 illustrates an example of an internal configuration of the mobile information terminal 100.

The mobile information terminal 100 may include an input unit 101, an output unit 102, a controller 103, a storage 104, and a communication processor 105. The input unit 101 may receive an input performed by a user. The output unit 102 may output various pieces of information to the user. The communication processor 105 may perform network communication.

The storage 104 may be a storage medium that stores various pieces of information. The storage 104 is not particularly limited in its form of the storage medium. The storage 104 may store print data or any other suitable data, for example. According to a third example embodiment of the technology described later, the storage 104 may have a function as a limitation information storage 104A, although the function as the limitation information storage 104A may not be used in the first example embodiment.

The controller 103 may include a central processing unit (CPU), and perform a control of each block in the mobile information terminal 100. Further, the controller 103 may perform various information processes directed to creation of print data. Further, the controller 103 may execute functions of various applications 103A. The controller 103 may execute a main operation of the mobile information terminal 100 described in a sequence diagram illustrated in FIG. 8 described later, by means of the function of each of the applications 103A. The functions of the applications 103A may include a printing reservation application that achieves a function of making a reservation for printing. According to the third example embodiment of the technology described later, the functions of the applications 103A may include a printing limitation application that achieves a function of limiting the printing, although the printing limitation application may not be used in the first example embodiment.

Figure 3:
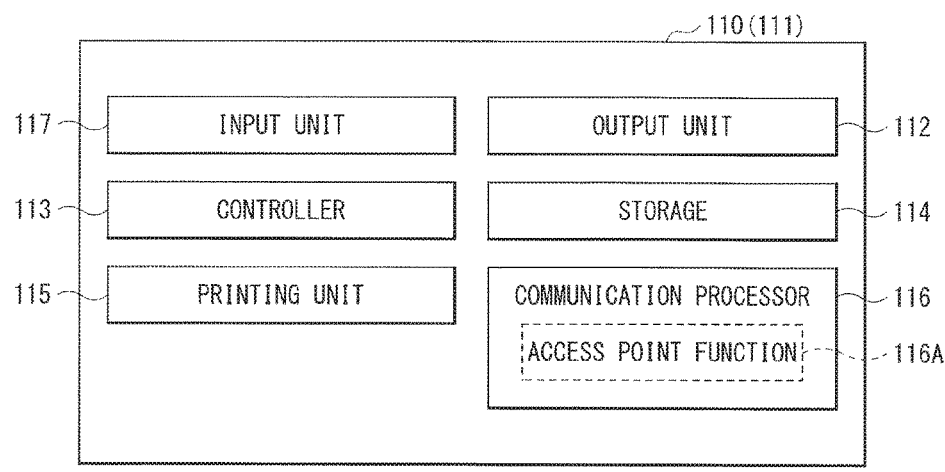
FIG. 3 is a block diagram illustrating an example of an internal configuration of an image forming apparatus according to the first example embodiment.

FIG. 3 illustrates an example of an internal configuration of the image forming apparatus 110.

The image forming apparatus 110 may include an input unit 117, an output unit 112, a controller 113, a storage 114, a printing unit 115, and a communication processor 116. The input unit 117 may receive an input performed by the user. The output unit 112 may output various pieces of information to the user. The printing unit 115 may perform printing. The communication processor 116 may perform network communication.

The storage 114 may be a storage medium that stores various pieces of information. The storage 114 is not particularly limited in its form of the storage medium. The storage 114 may temporarily store received print data, for example. Further, the storage 114 may store printing setting or any other suitable information, for example.

The controller 113 may include a CPU, and perform a control of each block in the image forming apparatus 110. Further, the controller 103 may perform various information processes directed to processing of the print data.

According to a second example embodiment of the technology described later, the communication processor 116 may have an access point function 116A, although the access point function 116A may not be used in the first example embodiment.

[Function of Application of Mobile Information Terminal 100]

The application 103A of the mobile information terminal 100 may include a function as a transmission reservation unit that makes a reservation for transmission of the print data to the image forming apparatus 110. On the basis of the function as the transmission reservation unit, the application 103A may cause a printing reservation process screen illustrated in FIG. 4 described later to be displayed, for example.

According to the first example embodiment, a plurality of image forming apparatuses 110 may be connected to the network that serves as the connection base. The application 103A may further include a function as a base detector that detects that the network that is to serve as the connection base becomes a connectable base. The application 103A may further include a function as an apparatus selector. The apparatus selector may perform a display process and a selection process upon detection of the connectable base to which the plurality of image forming apparatuses 110 are connected. The display process may display a list of the image forming apparatuses 110 that are connected to the connectable base. The selection process may allow for selection of the image forming apparatus 110, of the plurality of image forming apparatuses 110, to which the print data is to be transmitted. Further, the transmission reservation unit may include a function as an apparatus registering unit. The apparatus registering unit may allow for registration of the image forming apparatus 110, of the plurality of image forming apparatuses 110, for which the reservation of the transmission of the print data is made. On the basis of the function as the apparatus selector and the apparatus registering unit, the application 103A may cause, for example, an apparatus selection screen illustrated in FIG. 6 described later to be displayed.

When the plurality of image forming apparatuses 110 connected to the connectable base include the image forming apparatus 110 for which the reservation for the transmission of the print data is made by the apparatus registering unit, the application 103A may not necessarily perform the display process and the selection process.

A description is given below of examples of various screens which are caused to be displayed by the application 103A.

Figure 4:
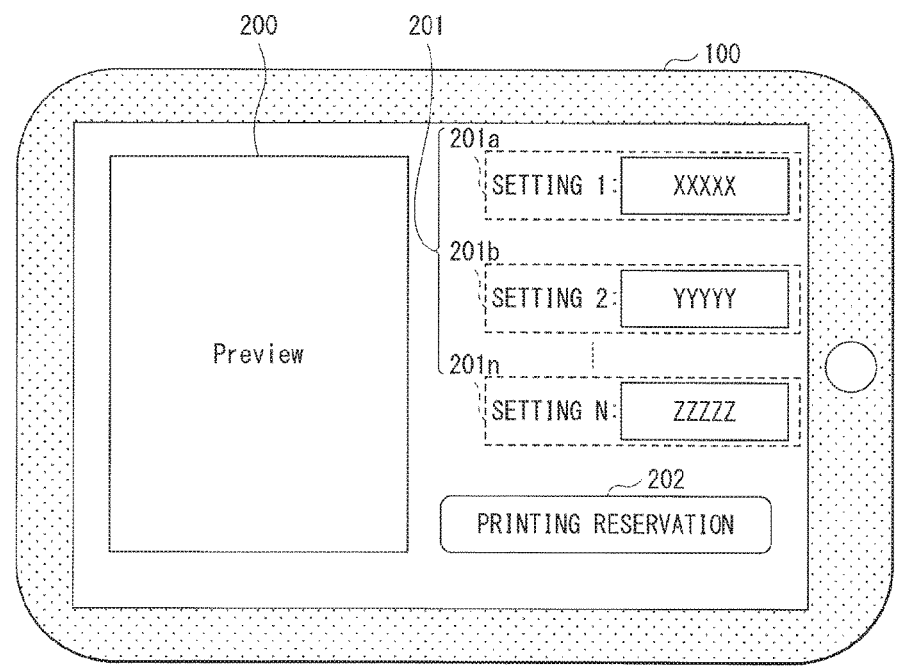
FIG. 4 is a diagram describing an example of a printing reservation process screen to be displayed on the mobile information terminal according to the first example embodiment.

FIG. 4 illustrates an example of a printing reservation process screen. The printing reservation process screen may be caused, by the function of the application 103A, to be displayed on the mobile information terminal 100. The printing reservation process screen illustrated in FIG. 4 may be displayed in a process in step S200 illustrated in FIG. 8 described later, for example.

The printing reservation process screen may include a print preview screen 200, a plurality of setting change sections 201a, 201b, . . . , 201n, and a printing reservation button 202. Hereinafter, the setting change sections 201a, 201b, . . . , 201n may be collectively referred to as a setting change section 201. The setting change section 201 may have a function of setting a printing setting such as a size of a sheet, a function of inputting a description of the printing job to be displayed upon the printing, or any other suitable function, for example.

Figure 5:
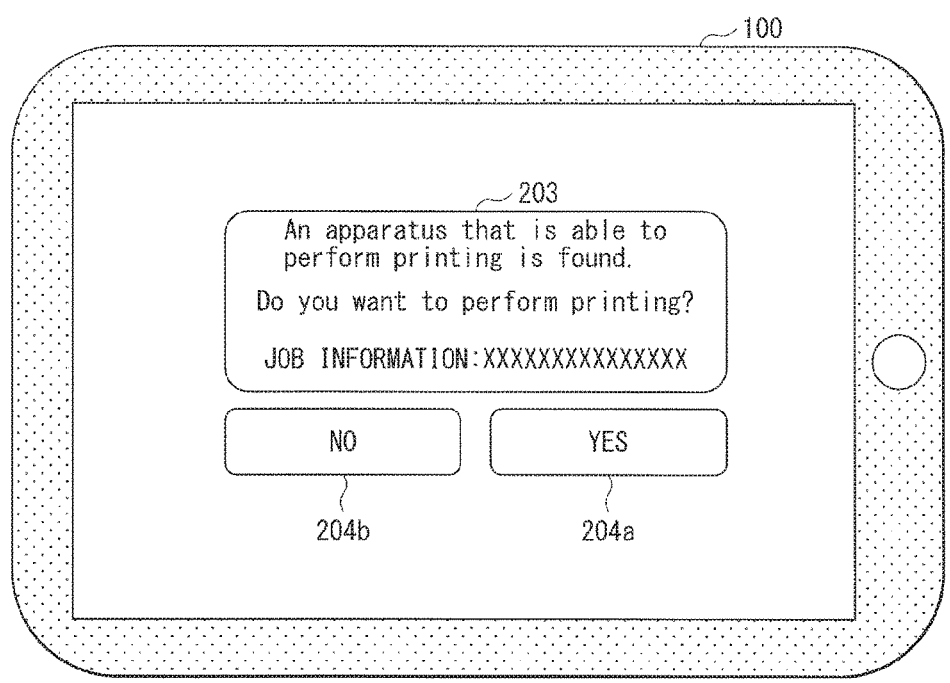
FIG. 5 is a diagram describing an example of a notification screen (a first notification screen) to be displayed on the mobile information terminal according to the first example embodiment.

FIG. 5 illustrates an example of a notification screen. The notification screen may be caused, by the function of the application 103A, to be displayed on the mobile information terminal 100. The notification screen illustrated in FIG. 5 may be displayed in a process in step S204 illustrated in FIG. 8 described later, for example.

The notification screen illustrated in FIG. 5 may include an information display section 203, a "Yes" button 204a, and a "No" button 204b. The information display section 203 may display information directed to the user. The user may be allowed to select whether to perform printing by the image forming apparatus 110. The user may be allowed to make the foregoing selection by means of the "Yes" button 204a and the "No" button 204b on the notification screen illustrated in FIG. 5.

Figure 6:
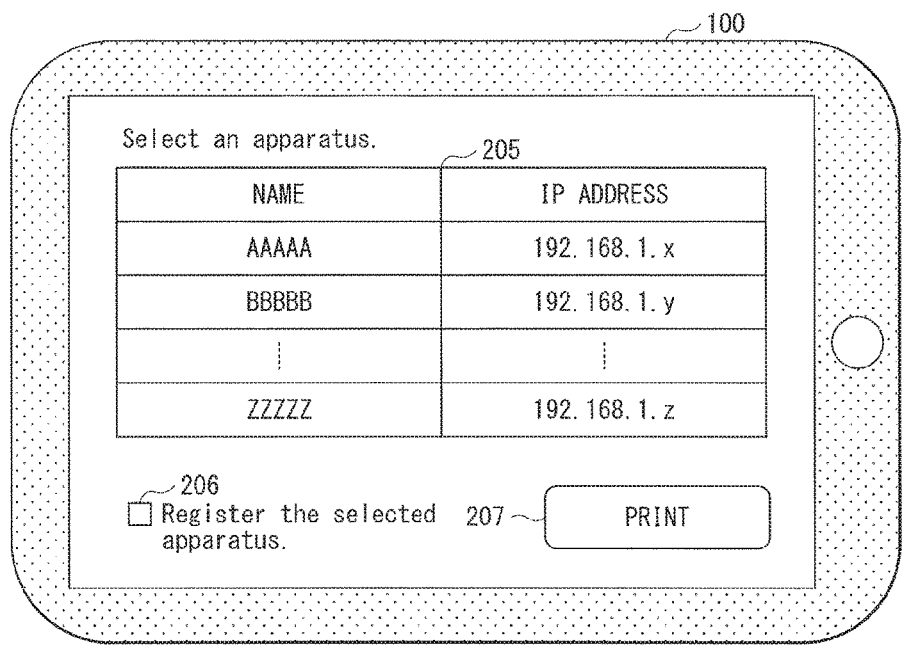
FIG. 6 is a diagram describing an example of an apparatus selection screen to be displayed on the mobile information terminal according to the first example embodiment.

FIG. 6 illustrates an example of an apparatus selection screen. The apparatus selection screen may be caused, by the function of the application 103A, to be displayed on the mobile information terminal 100. The apparatus selection screen illustrated in FIG. 6 may be displayed in a process in step S208 illustrated in FIG. 8 described later, for example.

The apparatus selection screen may display the one or more image forming apparatuses 110 that are present in the network. Further, the apparatus selection screen may include an apparatus selection section 205, an apparatus registration checkbox 206, and a print button 207. The apparatus selection section 205 may allow the user to make a selection. The apparatus registration checkbox 206 may be directed to registering any of the one or more image forming apparatuses 110 to the application 103A. The print button 207 may be directed to starting the printing. The registering of the image forming apparatus 110 to the application 103A may allow the user to cause the image forming apparatus 110 to perform the printing directly from the notification screen illustrated in FIG. 5 when the user makes a reservation for printing next time, without operating the apparatus selection screen illustrated in FIG. 6.

The image forming apparatus 110 to be displayed in the apparatus selection section 205 may be determined through filtering on the basis of a setting value set in the setting change section 201. To give an example, in a case where "A3" is designated as the sheet size in the setting change section 201, the filtering may be so performed as to exclude the image forming apparatus 110 that is not able to perform printing on a sheet having the size of "A3". In another example case where color printing is designated in the setting change section 201, the filtering may be so performed as to exclude the image forming apparatus 110 that is not able to perform the color printing. This improves usability for the user.

[1.2 Operation]

Figure 7:
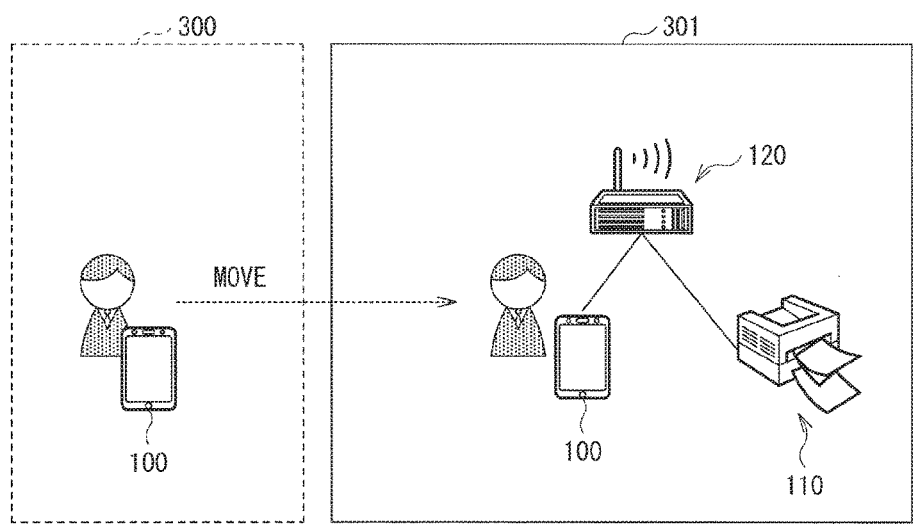
FIG. 7 is a diagram describing an example of a moving state of the mobile information terminal according to the first example embodiment.

FIG. 7 illustrates an example of a moving state of the mobile information terminal 100.

The mobile information terminal 100 may establish connection to the wireless LAN router 120, when the user carrying the mobile information terminal 100 moves from a private network outside region 300 into a private network inside region 301. The private network outside region 300 may be a region outside a private network environment. The private network inside region 301 may be a region inside the private network environment. Non-limiting examples of the private network environment may include a LAN inside an office. In response to the establishment of the connection to the wireless LAN router 120 as a trigger, the mobile information terminal 100 may search the image forming apparatus 110 in the network by means of the function of the application 103A. When the image forming apparatus 110 is found in the network, a notification may be displayed on the mobile information terminal 100. When the user agrees to perform the printing and selects the image forming apparatus 110, the mobile information terminal 100 may transmit a printing job to the image forming apparatus 110. The image forming apparatus 110 may perform the printing.

Figure 8:
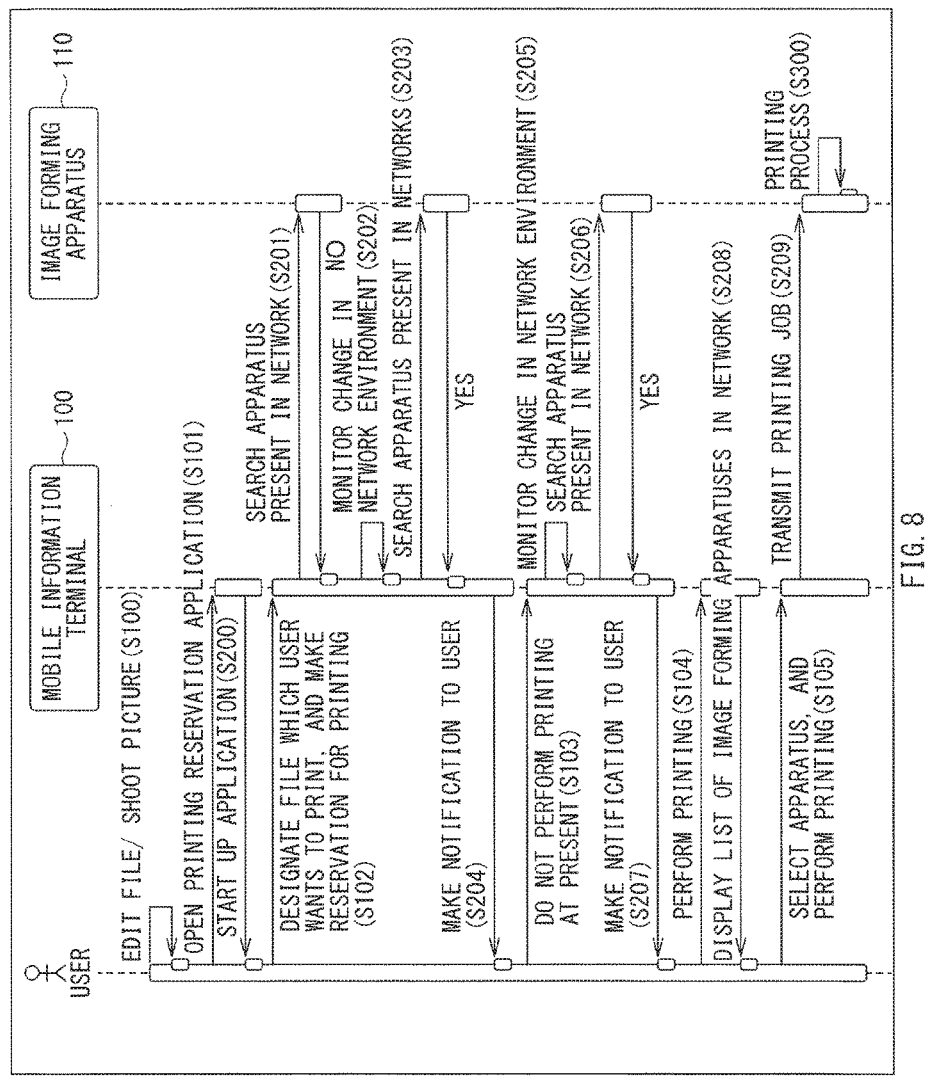
FIG. 8 is a sequence diagram illustrating an example of an outline of an operation of the information processing system according to the first example embodiment.

FIG. 8 is a sequence diagram illustrating an example of an outline of an operation of the information processing system according to the first example embodiment.

In step S100, the user may edit a file, shoot a picture, or perform any other operation. Thereafter, the user may start up the printing reservation application of the mobile information terminal 100 in steps S101 and S200. Thereafter, in step S102, the user may designate a file which the user wants to print. On this occasion, the printing reservation process screen illustrated in FIG. 4 may be displayed on the mobile information terminal 100. In step S201, the mobile information terminal 100 may search the image forming apparatus 110 in the network to which the mobile information terminal 100 is currently connected. When the mobile information terminal 100 is not connected to the network, the process in step S204 may not be necessarily performed.

In a case where the image forming apparatus 110 is not found, in a case where the image forming apparatus 110 is not connected to the network, or in any other case, the mobile information terminal 100 may monitor the network environment in step S202. When any change is brought to the network, the mobile information terminal 100 may search the image forming apparatus 110 again in step S203.

When the image forming apparatus 110 is found, the mobile information terminal 100 may perform notification to the user in step S204. On this occasion, the notification screen illustrated in FIG. 5 may be displayed on the mobile information terminal 100.

When the user cancels the printing on the notification screen illustrated in FIG. 5, i.e., when the user operates the "No" button 204b on the notification screen illustrated in FIG. 5, in step S103, the mobile information terminal 100 may start monitoring the network again in step S205. When any change is brought to the network, the mobile information terminal 100 may search the image forming apparatus 110 in step S206. When the image forming apparatus 110 is found, the mobile information terminal 100 may perform notification to the user in step S207.

When the user selects to perform the printing on the notification screen illustrated in FIG. 5. i.e., when the user operates the "Yes" button 204a on the notification screen illustrated in FIG. 5, in step S104, the mobile information terminal 100 may display the apparatus selection screen illustrated in FIG. 6, and thereby prompt the user to perform apparatus selection in step S208. The user may select any of the one or more image forming apparatuses 110 in the apparatus selection section 205 on the apparatus selection screen, and operate the print button 207 in step S105. After the user operates the print button 207, the mobile information terminal 100 may transmit the printing job to the image forming apparatus 110 selected by the user, in step S209. The image forming apparatus 110 may perform printing of the received printing job in step S300.

[1.3 Effects]

As described above, according to the first example embodiment, the user may perform the printing reservation process by the use of the mobile information terminal 100, when the user comes up with an idea of performing the printing. Thereafter, the change in the network environment of the mobile information terminal 100 may be monitored. When the image forming apparatus 110 that is able to perform the printing is found in the network, notification may be performed for the user. The user may be thereby prompted to perform the printing. In such a manner, the application 103A of the mobile information terminal 100 may perform the notification to the user. Therefore, it is possible to prevent the user from forgetting to perform the printing, even in a case where the user forgets about the printing when the user moves from the outside into the environment allowing for the printing. According to the first example embodiment, it is possible for the user to make a reservation for printing without being aware of the network environment, for example, without being aware of whether the mobile information terminal 100 is currently connected to the network, or without being aware of whether an image forming apparatus is present in the network. In addition, it is possible to prevent the user from forgetting to perform the printing by searching the image forming apparatus 110 in the network when the network environment is changed in accordance with the movement of the user, and performing the notification to the user.

[2. Second Example Embodiment]

A description is given next of an information processing system according to the second example embodiment of the technology. It is to be noted that components of the information processing system according to the second example embodiment that are substantially similar to those according to the foregoing first example embodiment may be denoted with the same numerals, and will not be described further where appropriate.

[2.1 Configuration]

Figure 9:
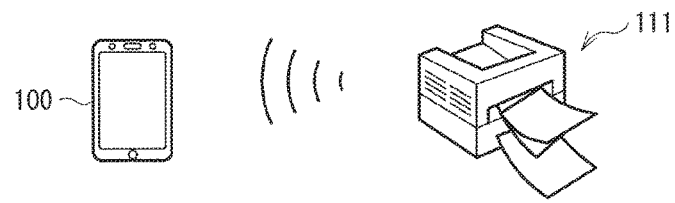
FIG. 9 is a configuration diagram illustrating an example of an outline of an information processing system according to a second example embodiment of the technology.

FIG. 9 illustrates an example of an outline of the information processing system according to the second example embodiment.

The information processing system according to the second example embodiment may include the mobile information terminal 100 and an image forming apparatus 111.

The image forming apparatus 111 may have an internal configuration that is substantially similar to that of the image forming apparatus 110 according to the foregoing first example embodiment. It is to be noted that, however, the image forming apparatus 111 may be different from the image forming apparatus 110 in that the communication processor 116 has the access point function 116A as illustrated in FIG. 3. This may cause the image forming apparatus 111 to function as an access point, and make the image forming apparatus 111 able to perform direct communication with the mobile information terminal 100.

The mobile information terminal 100 according to the second example embodiment may have an internal configuration that is substantially similar to that of the mobile information terminal 100 according to the foregoing first example embodiment illustrated in FIG. 2. The mobile information terminal 100 according to the second example embodiment may have a function of the application 103A that is substantially similar to that according to the foregoing first example embodiment. It is to be noted that, however, the function of the application 103A according to the second example embodiment may be partially different from that according to the foregoing first example embodiment, in order to allow the information processing apparatus applied to the information processing system to encompass also the image forming apparatus 111 that serves as the access point.

Figure 10:
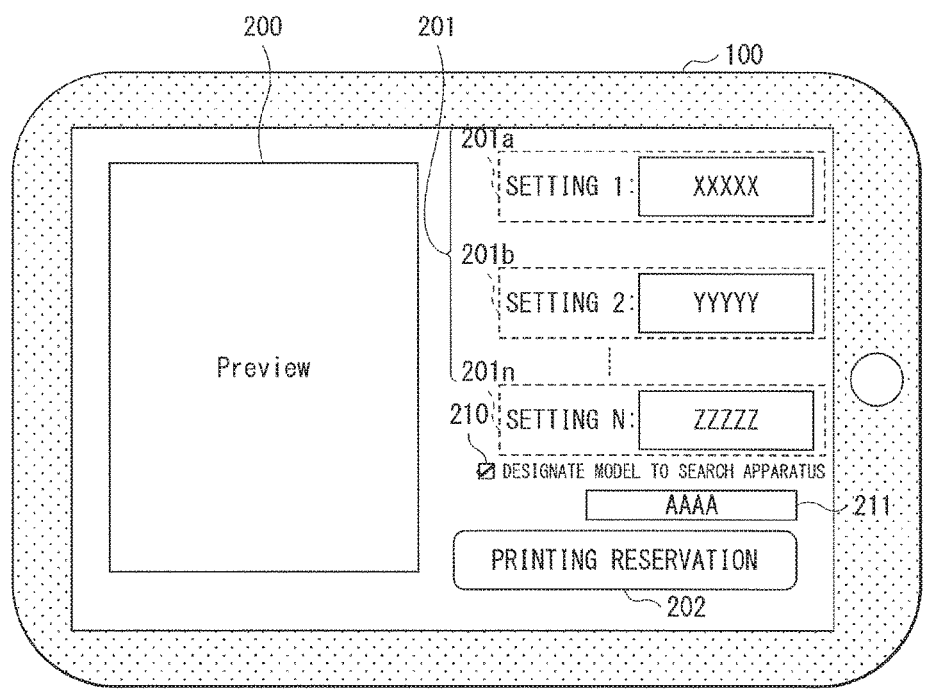
FIG. 10 is a diagram describing an example of a printing reservation process screen to be displayed on a mobile information terminal according to the second example embodiment.

FIG. 10 illustrates an example of a printing reservation process screen according to the second example embodiment. The printing reservation process screen may be caused, by the function of the application 103A, to be displayed on the mobile information terminal 100. The printing reservation process screen illustrated in FIG. 10 may be displayed in a process in step S500 illustrated in FIG. 14 described later, for example.

The printing reservation process screen illustrated in FIG. 10 may include the print preview screen 200, the setting change section 201, i.e., the setting change sections 201*a*, 201*b* . . . . , 201*n*, and the printing reservation button 202, as with the printing reservation process screen illustrated in FIG. 4. The printing reservation process screen illustrated in FIG. 10 may further include a checkbox 210 and a character string input field 211 both as a setting change section regarding searching for an apparatus outside the private network. The character string input field 211 may be editable only when the checkbox 210 is ON. When the checkbox 210 is ON, the image forming apparatus 111 serving as the access point may be also included in a target of the searching, in addition to the image forming apparatus 110 in the regular private network. On this occasion, only the image forming apparatus 111 having a model name inputted in the character string input field 211 may be searched.

Figure 11:
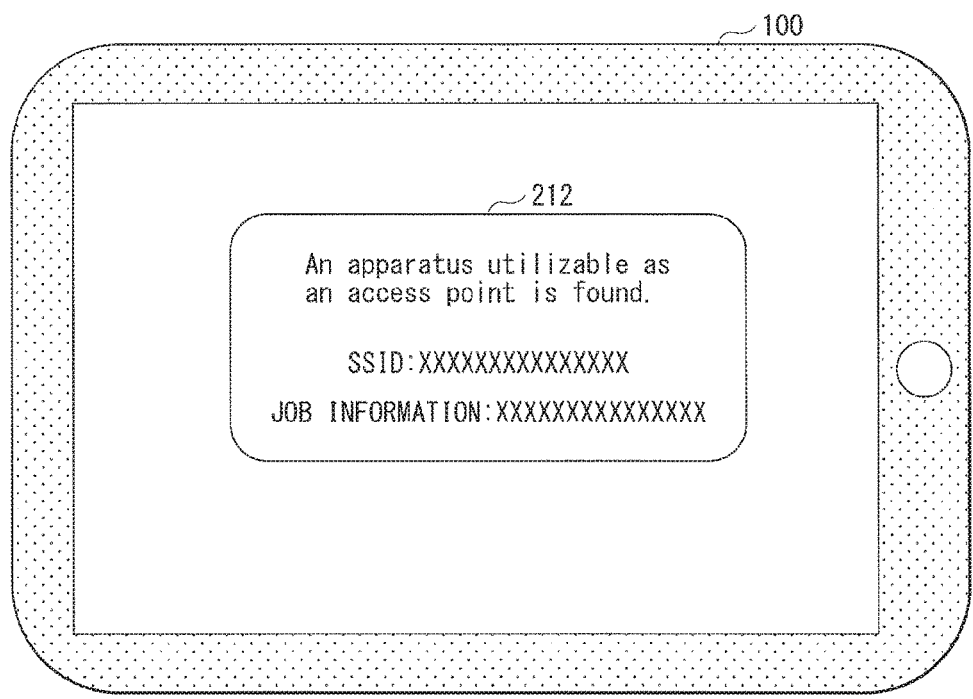
FIG. 11 is a diagram describing an example of a notification screen to be displayed on the mobile information terminal when an image forming apparatus is found as an access point, according to the second example embodiment.

FIG. 11 illustrates an example of a notification screen that is displayed on the mobile information terminal 100 when the image forming apparatus 111 is found as the access point by the function of the application 103A. The notification screen illustrated in FIG. 11 may be displayed, when the image forming apparatus 111 having the model name inputted in the character string input field 211 on the printing reservation process screen illustrated in FIG. 10 is found as the access point. The notification screen illustrated in FIG. 11 may be displayed in a process in step S503 illustrated in FIG. 14 described later, for example.

The notification screen illustrated in FIG. 11 may have an information display section 212. Information regarding a service set identifier (SSID) of the access point and information regarding the printing job to be performed may be displayed in the information display section 212.

Figure 12:
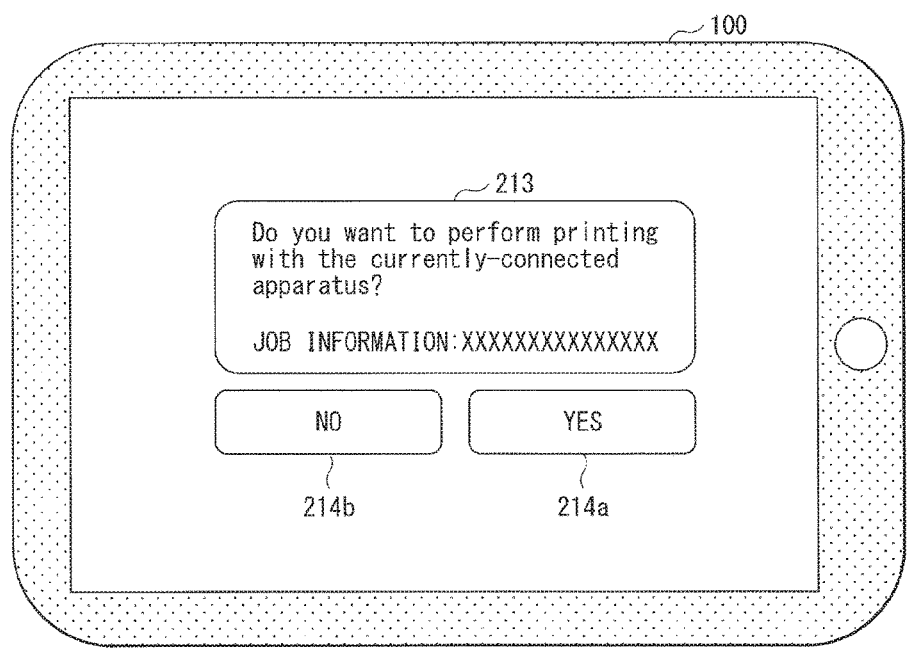
FIG. 12 is a diagram describing an example of the notification screen to be displayed on the mobile information terminal when the mobile information terminal is connected to the access point, according to the second example embodiment.

FIG. 12 illustrates an example of a notification screen that is displayed on the mobile information terminal 100 by the function of the application 103A, when the connection between the mobile information terminal 100 and the access point is established. The notification screen illustrated in FIG. 12 may be displayed after a process in step S403 illustrated in FIG. 12 described later, for example.

The notification screen illustrated in FIG. 12 may include an information display section 213, a "Yes" button 214*a*, and a "No" button 214*b*. The information display section 213 may display information directed to the user. The user may be allowed to select whether to perform printing by the image forming apparatus 111 serving as the access point to which the mobile information terminal 100 is connected. The user may be allowed to make the foregoing selection by means of the "Yes" button 214*a* and the "No" button 214*b* on the notification screen illustrated in FIG. 12.

[2.2 Operation]

Figure 13:
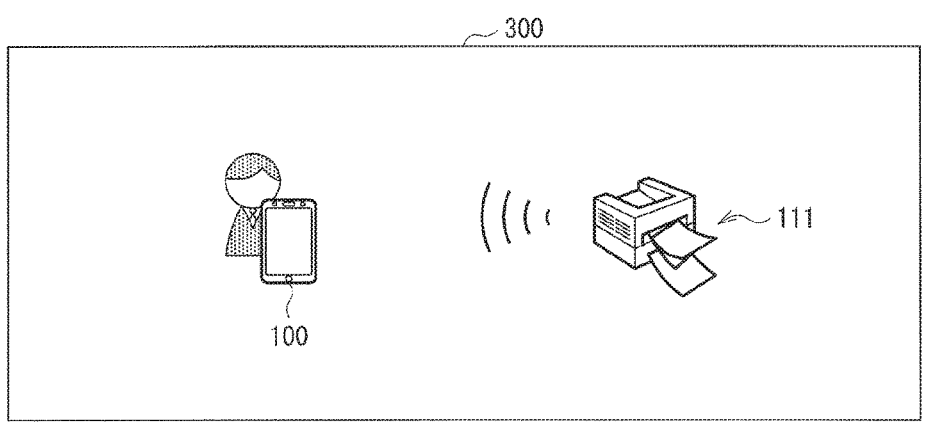
FIG. 13 is a diagram describing an example of a communication mode of the information processing system according to the second example embodiment.

FIG. 13 illustrates an example of a communication mode of the information processing system according to the second example embodiment.

The image forming apparatus 111 directed to shared utilization may be present in the private network outside region 300, for example, in a convenience store, a public space, or any other suitable location. In order to cause the image forming apparatus 111 and the mobile information terminal 100 to perform mutual communication with each other, it may be necessary for the mobile information terminal 100 to also join the private network which the image forming apparatus 111 joins. However, it may not be favorable to allow the private network to be open to many and unspecified users. Therefore, the image forming apparatus 111 may have a function of operating solely as the access point. In this case, it is possible for the mobile information terminal 100 to perform communication with the image forming apparatus 111 ad hoc, without joining the private network.

Figure 14:
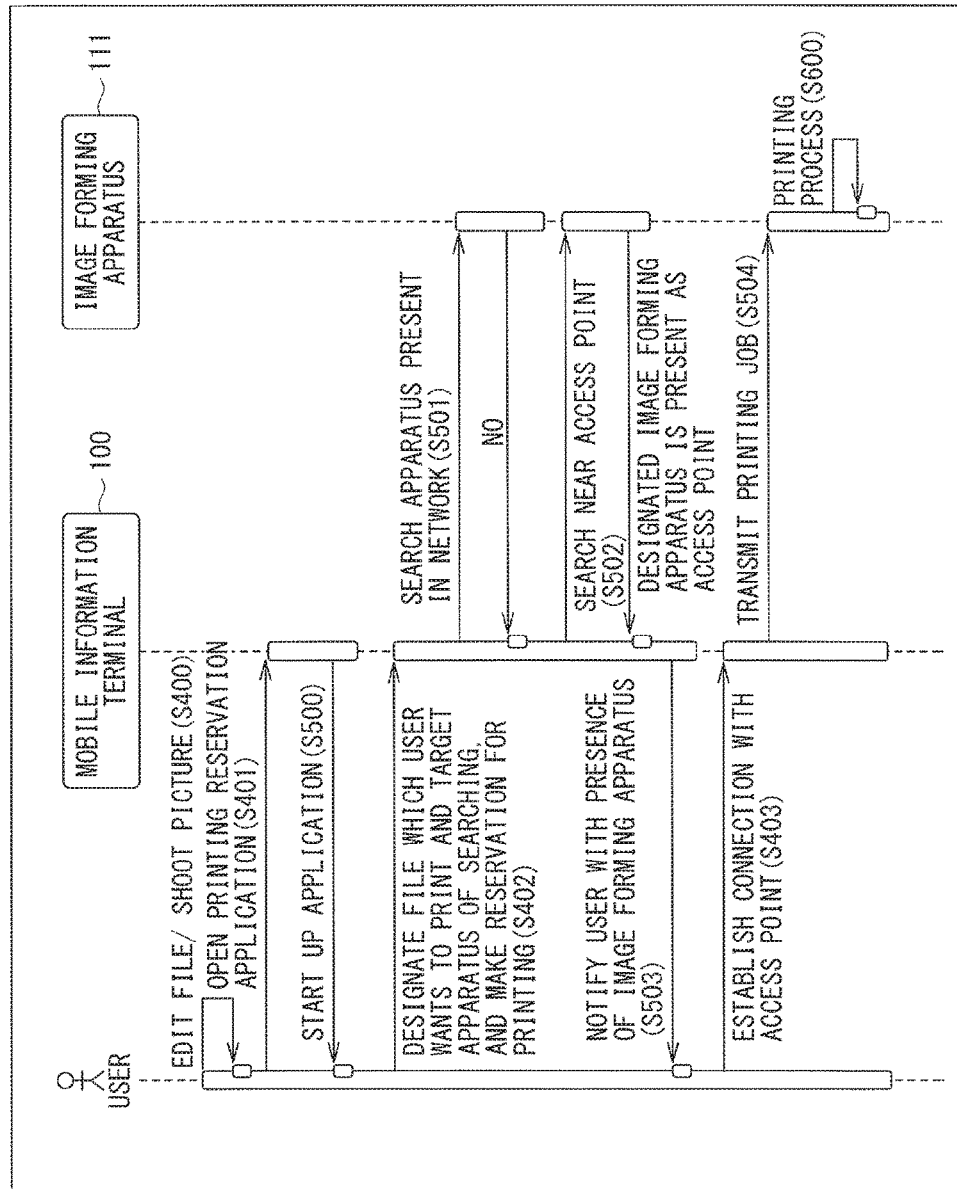
FIG. 14 is a sequence diagram illustrating an example of an outline of an operation of the information processing system according to the second example embodiment.

FIG. 14 is a sequence diagram illustrating an example of an outline of an operation of the information processing system according to the second example embodiment.

First, in step S400, the user may edit a file, shoot a picture, or perform any other operation. Thereafter, the mobile information terminal 100 may start up the printing reservation application in step S401. Thereafter, in step S402, the user may designate the file which the user wants to print, and the model name of the image forming apparatus to be set as the target of searching outside the private network, as described referring to the printing reservation process screen illustrated in FIG. 10.

In step S501, the mobile information terminal 100 may first search the image forming apparatus 111 by means of the network to which the mobile information terminal 100 is currently connected. The process in step S501 may not be necessarily performed when the mobile information terminal 100 is not connected to any network.

Thereafter, in step S502, the mobile information terminal 100 may search for an access point that is present near the mobile information terminal 100. When the image forming apparatus 111 designated upon the printing reservation is found as the access point, the mobile information terminal 100 may notify the user of the presence of the image forming apparatus 111 serving as the access point, as on the notification screen illustrated in FIG. 11, in step S503. In step S403, the user may cause the mobile information terminal 100 to establish connection with the image forming apparatus 111 serving as the access point, by selecting the "Yes" button 214a on the notification screen illustrated in FIG. 12. The mobile information terminal 100 may detect the establishment of the connection between the mobile information terminal 100 and the access point, and thereafter transmit the printing job to the image forming apparatus 111 serving as the access point, in step S504. The image forming apparatus 111 may receive the printing job, and thereafter perform the printing in step S600. In one non-limiting example, the establishment of the connection between the mobile information terminal 100 and the image forming apparatus 111 serving as the access point may be performed on a condition that: the SSID of the mobile information terminal 100 and the SSID of the access point are coincident with each other; an authentication process of the mobile information terminal 100 is executed thereafter with respect to the access point; and the authentication process is successful.

[2.3 Effects]

As described above, according to the second example embodiment, it is possible to utilize, as the connection base, the image forming apparatus 111 having the access point function. This makes it possible, for example, when the image forming apparatus 111 having the access point function becomes present near the user before the user moves into the private network environment, to notify the user that the image forming apparatus 111 having the access point function is present near the user. This allows the user to perform more swift printing. Hence, it is possible to prevent the user from forgetting to perform the printing.

Configurations, operations, and effects of the information processing system according to the second example embodiment other than those described above may be substantially similar to those of the information processing system according to the foregoing first example embodiment.

[3. Third Example Embodiment]

A description is given next of an information processing system according to the third example embodiment of the technology. It is to be noted that components of the information processing system according to the third example embodiment that are substantially similar to those according to any of the foregoing first and second example embodiments may be denoted with the same numerals, and will not be described further where appropriate.

[3.1 Configuration]

Figure 15:
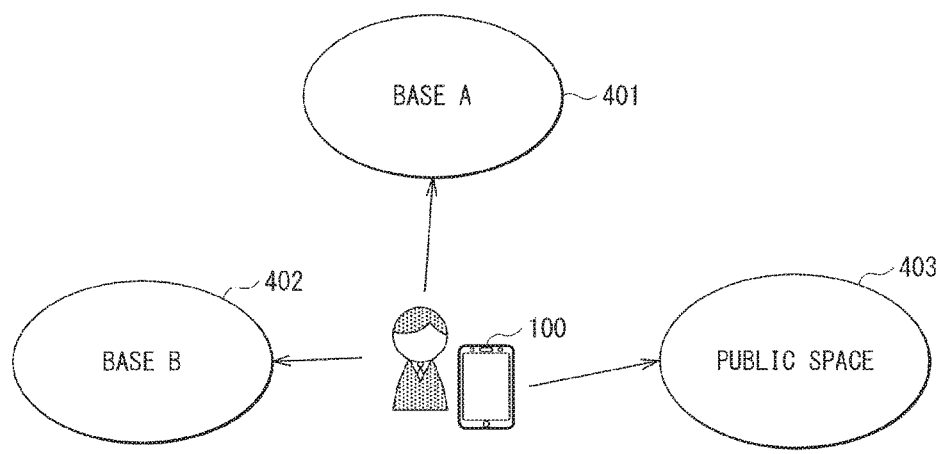
FIG. 15 is a diagram describing an example of a communication mode of an information processing system according to a third example embodiment of the technology.

FIG. 15 illustrates an example of a communication mode of the information processing system according to the third example embodiment.

The information processing system according to the third example embodiment may include the mobile information terminal 100 and an image forming apparatus. The image forming apparatus included in the information processing system according to the third example embodiment may be substantially similar to any of the image forming apparatus 110 according to the foregoing first example embodiment and the image forming apparatus 111 according to the foregoing second example embodiment.

According to the third example embodiment, a plurality of connection bases to which the mobile information terminal 100 is connectable may be present. In one non-limiting example, a base A 401, a base B 402, and a public space 403 may be present as the connection bases. Each of the foregoing connection bases may be the network, such as the wireless LAN, in the private network inside region 301 described above in the first example embodiment, or the access point, such as the image forming apparatus 111 having the access point function 116A, in the private network outside region 300 described above in the second example embodiment.

In a case where the user moves among the foregoing plurality of bases and performs printing at each of the bases, it may be desired to perform printing limitation for each of the bases in some cases. Accordingly, according to the third example embodiment, a comparison may be made between the SSID of the network which the mobile information terminal 100 joins and the SSID stored in the mobile information terminal 100. When the SSID of the network which the mobile information terminal 100 joins and the SSID stored in the mobile information terminal 100 are coincident with each other as a result of the comparison, a printing control may be performed on the basis of a set limitation.

The mobile information terminal 100 according to the third example embodiment may have an internal configuration that is substantially similar to that of the mobile information terminal 100 according to any of the foregoing first and example embodiments. The mobile information terminal 100 according to the third example embodiment may have a function of the application 103A that is substantially similar to that according to any of the foregoing first and second example embodiments. It is to be noted that, however, the function of the application 103A according to the third example embodiment may be partially different from those according to the foregoing first and second example embodiments, in order to perform the printing limitation on each of the foregoing bases. According to the third example embodiment, the function of the application 103A of the mobile information terminal 100 may include the printing limitation application illustrated in FIG. 2. The printing limitation application may achieve a function of the printing limitation.

Further, the storage 104 of the mobile information terminal 100 according to the third example embodiment may include the limitation information storage 104A. The limitation information storage 104A may store the limitation information regarding the process to be performed on the print data, in association with each piece of base identification information. The base identification information may be directed to identification of each of the connection bases such as the network or the access point. Non-limiting examples of the base identification information may include the SSID. The application 103A may have a function as an associating processor. The associating processor may associate the limiting information with each piece of the base identification information directed to identification of the respective connection bases.

According to the third example embodiment, the application 103A of the mobile information terminal 100 may have a function as the transmission reservation unit. The transmission reservation unit may make a reservation for transmission of the print data to the image forming apparatus serving as the information processing apparatus, i.e., any of the image forming apparatuses 110 and 111, that is connected to at least one of the plurality of connection bases.

The application 103A may further have a function as the base detector. The base detector may detect that any of the connection bases becomes the connectable base.

The application 103A may have a function as a controller. The controller may cause, when the connectable base is detected by the base detector, the image forming apparatus connected to the connectable base to perform the data process based on the limitation information. Further, the application 103A may have a function as a first transmitter. The first transmitter may acquire the limitation information corresponding to the connectable base from the limitation information storage 104A, when the connectable base is detected by the base detector. Further, the first transmitter may transmit the data of the data process for which the reservation is made by the transmission reservation unit, to the image forming apparatus, i.e., any of the image forming apparatuses 110 and 111, via the connectable base. The first transmitter so perform the foregoing transmission of the data of the data process that the process based on the limitation information is performed by the image forming apparatus connected to the connectable base.

Figure 16:
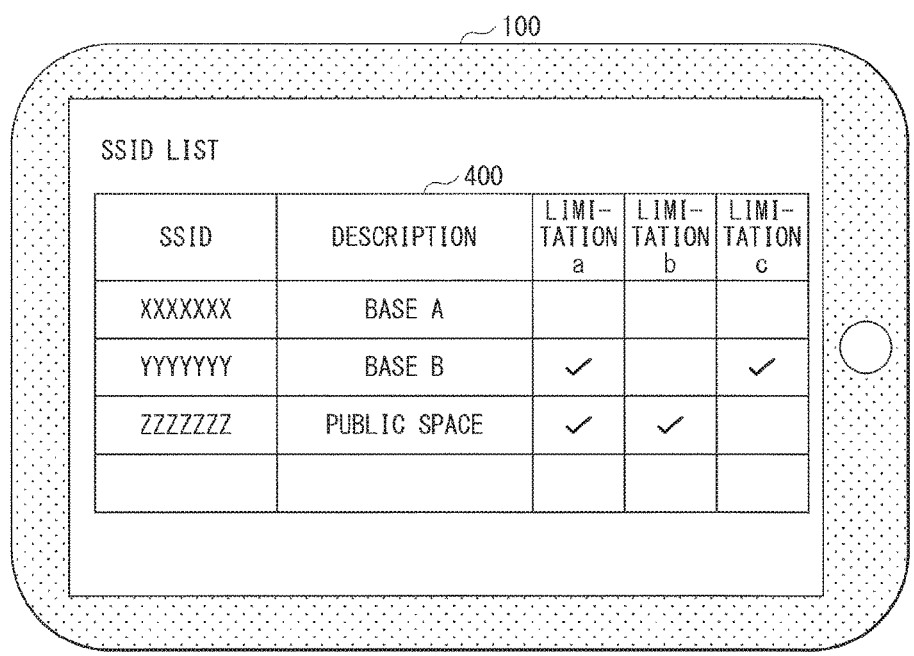
FIG. 16 is a diagram describing an example of a printing limitation setting screen to be displayed on a mobile information terminal according to the third example embodiment.

FIG. 16 describes an example of a printing limitation setting screen. The printing limitation setting screen may be caused, by the function of the application 103A, to be displayed on the mobile information terminal 100, according to the third example embodiment.

The application 103A may cause a list screen 400 to be displayed, through the function of the printing limitation application. The list screen 400 may be directed to displaying of a list of SSIDs. The mobile information terminal 100 may store the SSID and the limitation regarding printing in association with each other, and perform an output control for each SSID. Non-limiting examples of the limitation regarding printing may include attachment of a watermark, automatic transmission of a mail, whether color printing is permitted, and whether printing itself is permitted.

FIG. 16 illustrates an example in which no printing limitation is performed at the base A 401, but it is desired that the printing is to be performed with the attachment of a watermark upon the printing at the base B 402. The base B 402 may be, for example, a base at a place which the user visits for a business trip. In this case, it is possible to perform the printing control by causing an administrator to register the SSID of the base B 402 as illustrated in FIG. 16.

[3.2 Operation]

Figure 17:
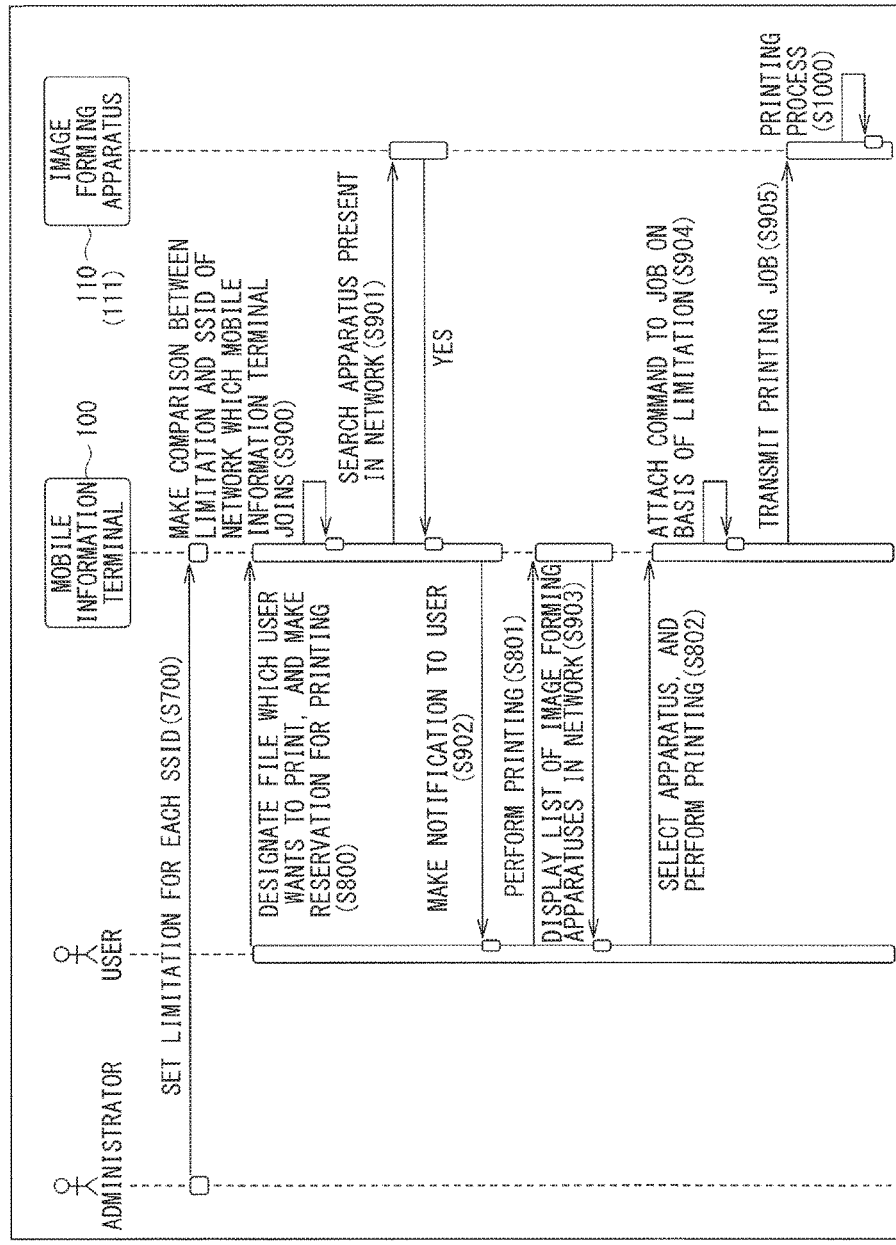
FIG. 17 is a sequence diagram illustrating an example of an outline of an operation of the information processing system according to the third example embodiment.

FIG. 17 is a sequence diagram illustrating an example of an outline of an operation of the information processing system according to the third example embodiment.

First, in step S700, the administrator who wants to perform the printing control may perform setting of the printing control by means of the application 103A of the mobile information terminal 100 as illustrated in FIG. 16. Thereafter, the user may make a reservation for printing in step S800, as in the steps illustrated in FIGS. 4 and 10 according to the first and second example embodiments.

After the reservation for printing is made, in step S900, the mobile information terminal 100 may monitor the change in the network, and make a comparison between the SSID of the network which the mobile information terminal 100 joins and a set value in the application 103A. On this occasion, when the SSID of the network which the mobile information terminal 100 joins is not permitted to perform printing, searching for the image forming apparatus 110 or 111 may not be performed. When the SSID of the network which the mobile information terminal 100 joins is permitted to perform printing, the image forming apparatus 110 or 111 may be searched in the network in step S901. In one non-limiting example, the establishment of the connection between the mobile information terminal 100 and the network may be performed on a condition that: the SSID of the mobile information terminal 100 and the SSID of the network are coincident with each other; an authentication process of the mobile information terminal 100 is executed thereafter with respect to the network; and the authentication process is successful.

When the image forming apparatus 110 or 111 is found in the network, the mobile information terminal 100 may cause the notification screen illustrated in FIG. 5 to be displayed to thereby make a notification to the user in step S902, as in the foregoing first example embodiment. The user may input whether to perform the printing in step S801. The mobile information terminal 100 may cause a list of image forming apparatuses in the network in step S903, as in the foregoing first example embodiment referring to FIG. 6. The user may select the image forming apparatus 110 or 111 to perform the printing in step S802.

After the image forming apparatus 110 or 111 to perform the printing is determined, the mobile information terminal 100 may attach a command, etc. to the printing job, on the basis of the limitation, in step S904. Thereafter, the mobile information terminal 100 may transmit the printing job to the image forming apparatus 110 or 111 in step S905. The image forming apparatus 110 or 111 may perform the printing based on the received printing job in step S1000.

[3.3 Effects]

As described above, according to the third example embodiment, when the connectable base is detected, the limitation information corresponding to the connectable base may be acquired from the limitation information storage 104A, and the data of the data process for which the reservation is made by the transmission reservation unit may be transmitted to the image forming apparatus serving as the information processing apparatus via the connectable base, in the mobile information terminal 100. The foregoing transmission of the data of the data process may be so performed that the process based on the limitation information is performed by the image forming apparatus connected to the connectable base. Hence, it is possible to perform the transmission of the data and the data process both with high usability for the user.

According to the third example embodiment, registration of the printing control setting in advance makes it possible for the user to perform the printing or to make a reservation for printing by means of the mobile information terminal 100, without being aware of a rule for the printing set for each of the bases.

Configurations, operations, and effects of the information processing system according to the third example embodiment other than those described above may be substantially similar to those of the information processing system according to any of the foregoing first and second example embodiments.

[4. Fourth Example Embodiment]

A description is given next of an information processing system according to a fourth example embodiment of the technology. It is to be noted that components of the information processing system according to the fourth example embodiment that are substantially similar to those according to any of the foregoing first to third example embodiments may be denoted with the same numerals, and will not be described further where appropriate.

[4.1 Configuration]

Figure 18:
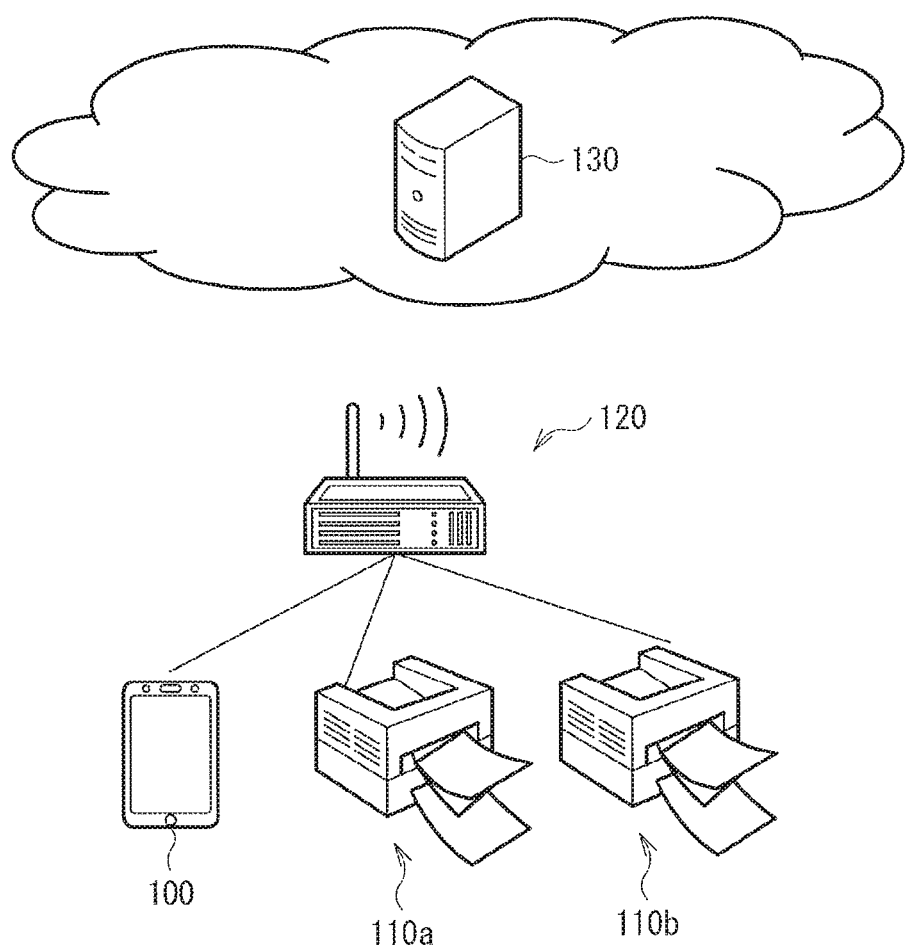
FIG. 18 is a configuration diagram illustrating an example of an outline of an information processing system according to a fourth example embodiment of the technology.

FIG. 18 illustrates an example of an outline configuration of the information processing system according to the fourth example embodiment of the technology.

The information processing system according to the fourth example embodiment may include the mobile information terminal 100 and a plurality of image forming apparatuses. In the information processing system according to the fourth example embodiment, the mobile information terminal 100 and the plurality of image forming apparatuses may have functions that are substantially similar to those in the information processing system according to the third example embodiment, except for a function regarding a cloud service described below. Further, the mobile information terminal 100 and the image forming apparatuses according to the fourth example embodiment may have basic configurations that are substantially similar to the basic configurations of the mobile information terminal 100 according to the foregoing first example embodiment illustrated in FIG. 2 and the image forming apparatus 110 according to the foregoing first example embodiment illustrated in FIG. 3, respectively, except for partial configurations that are related to the cloud service described below. The description below refers to an example case where the plurality of image forming apparatuses are two image forming apparatuses, i.e., an image forming apparatus 110a and an image forming apparatus 110b, that each have a function and a configuration that are substantially similar to those of the image forming apparatus 110 illustrated in FIG. 3. It is to be noted that, however, the number of the image forming apparatuses to be provided may be three or greater.

Referring to FIG. 18, the information processing system according to the fourth example embodiment, the mobile information terminal 100, the image forming apparatus 110a, and the image forming apparatus 110b may be connected to each other by means of the wireless LAN router 120, and thereby be able to perform mutual communication with each other. Further, the mobile information terminal 100, the image forming apparatus 110a, and the image forming apparatus 110b may be able to perform communication with an external server 130, for example, via the wireless LAN router 120 and the Internet. The external server 130 may be provided on a cloud. It is to be noted that the mobile information terminal 100 may be also configured to perform communication with the external server 130 via the Internet without the wireless LAN router 120. The external server 130 may provide a file service on the cloud, i.e., a cloud service.

Figure 21:
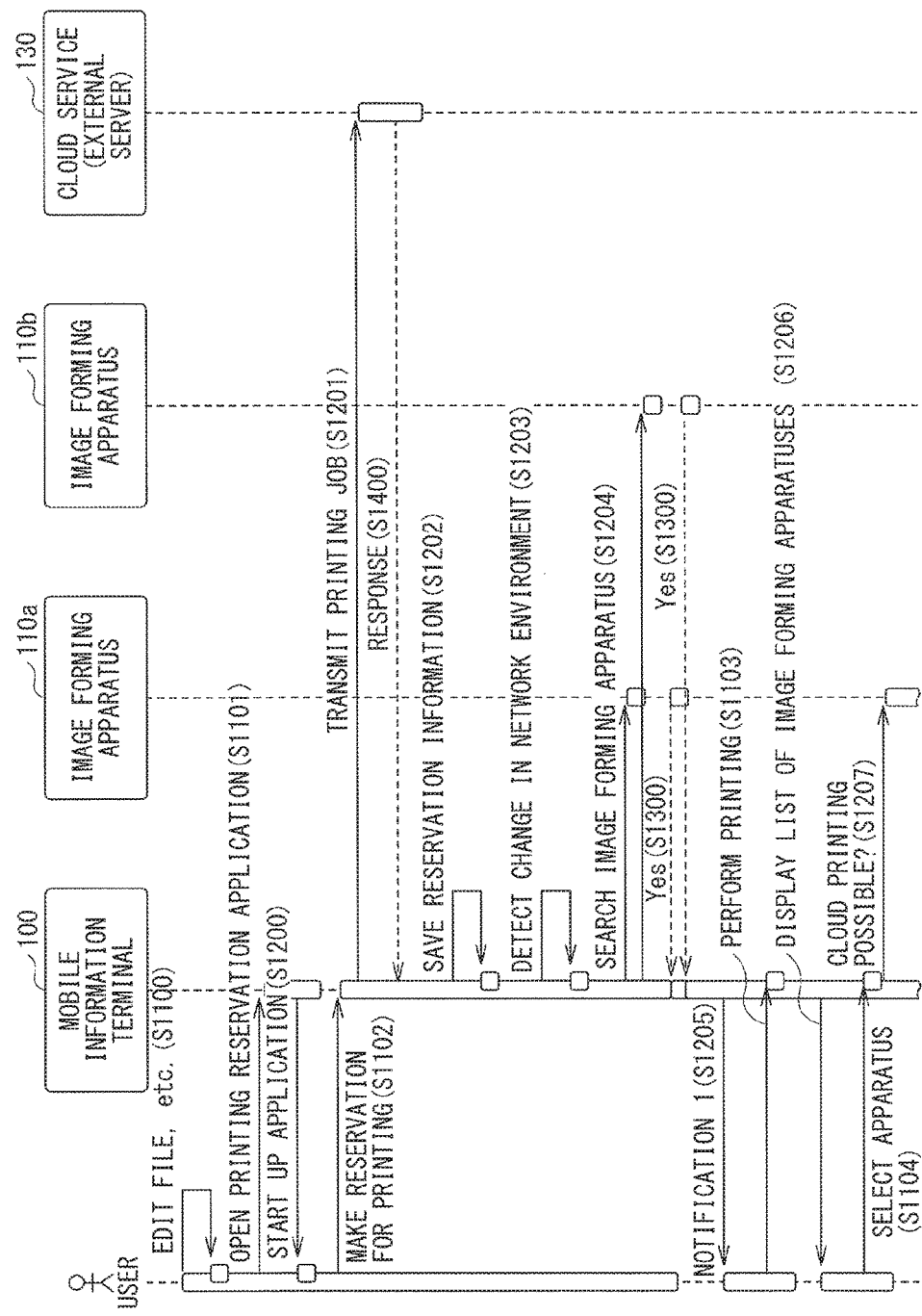
FIG. 21 is a sequence diagram illustrating an example of an outline of an operation of the information processing system according to the fourth example embodiment.
Figure 22:
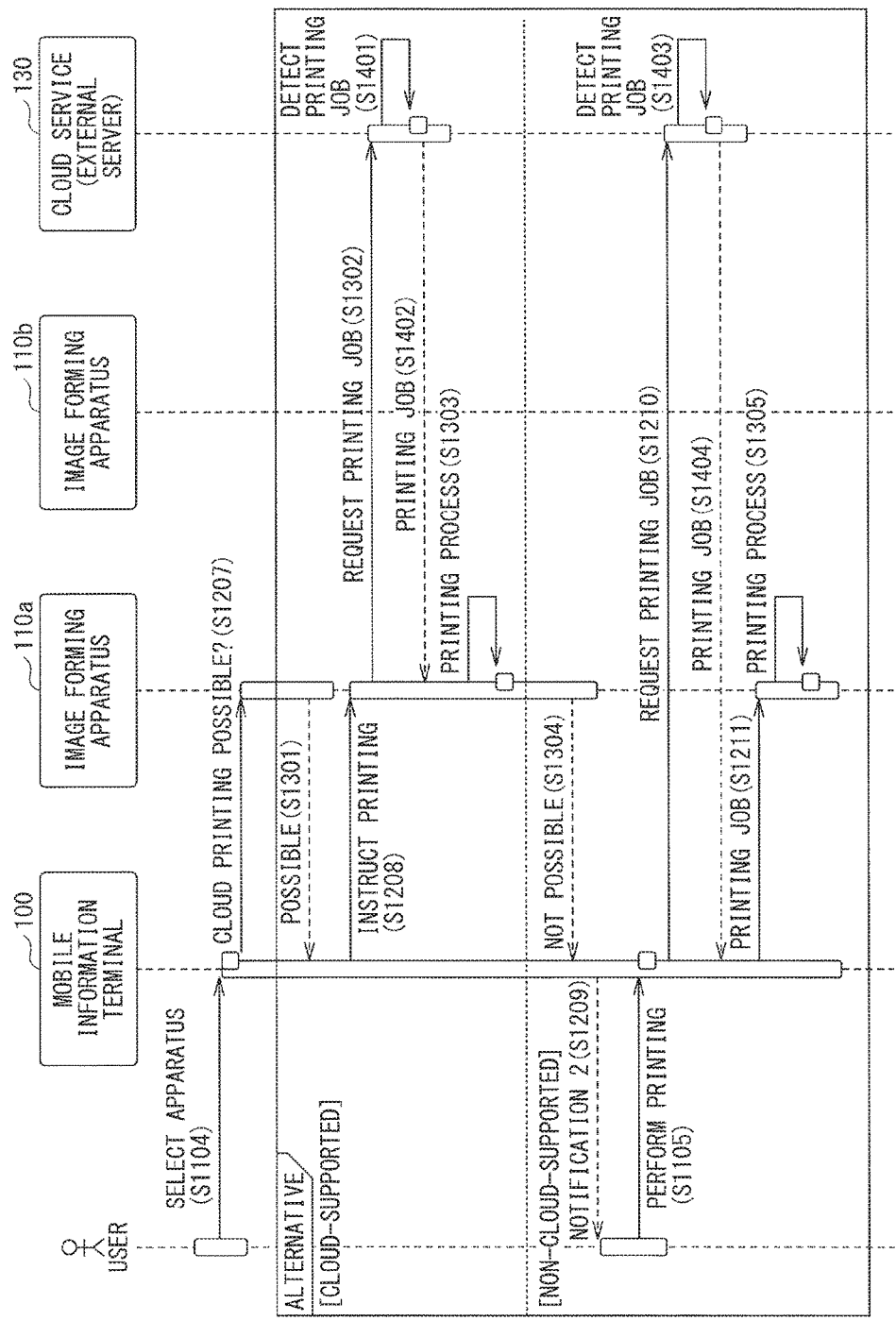
FIG. 22 is a sequence diagram illustrating an example of an operation of the information processing system following the operation illustrated in FIG. 21.

One or both of the image forming apparatuses 110a and 110b may have a printing function compliant with the cloud service. The printing function compliant with the cloud service may be, for example but not limited to, a function of downloading the printing job from the external server 130 to perform printing. This function may be hereinafter also referred to as a cloud printing function or a cloud-supported function. It is to be noted that there may be possibly a case in which neither the image forming apparatus 110a nor the image forming apparatus 110b has the cloud printing function. The information processing system according to the fourth example embodiment may allow for selection between printing processes of different modes, on the basis of whether each of the image forming apparatuses 110a and 110b has the cloud printing function, as illustrated in FIGS. 21 and 22 described later.

[Function of Application 103A of Mobile Information Terminal 100]

According to the fourth example embodiment, the printing job to be transmitted from the mobile information terminal 100 to the external server 130 may include limitation information similar to that of the information processing system according to the foregoing third example embodiment. According to the fourth example embodiment, the application 103A of the mobile information terminal 100 may have a function as a second transmitter. The second transmitter may attach the limitation information to the printing job, and transmit the printing job attached with the limitation information to the external server 130. Further, the application 103A may have the function as the base detector, as in the foregoing third example embodiment. The base detector may detect that any of the plurality of connection bases becomes the connectable base. The application 103A may further have a function as a controller. The controller may cause, when the connectable base is detected by the base detector, the image forming apparatus connected to the connectable base to acquire, from the external server 130, the printing job executed by the process execution unit. The controller may so cause the image forming apparatus serving as the information processing apparatus connected to the connectable base to acquire the foregoing printing job that the image forming apparatus performs the process based on the limitation information.

The mobile information terminal 100 in the information processing system according to the fourth example embodiment may cause, by the function of the application 103A, any of the printing reservation process screen illustrated in FIG. 4, the first notification screen illustrated in FIG. 5, and the apparatus selection screen illustrated in FIG. 6, to be displayed, as in the foregoing first example embodiment.

Figure 19:
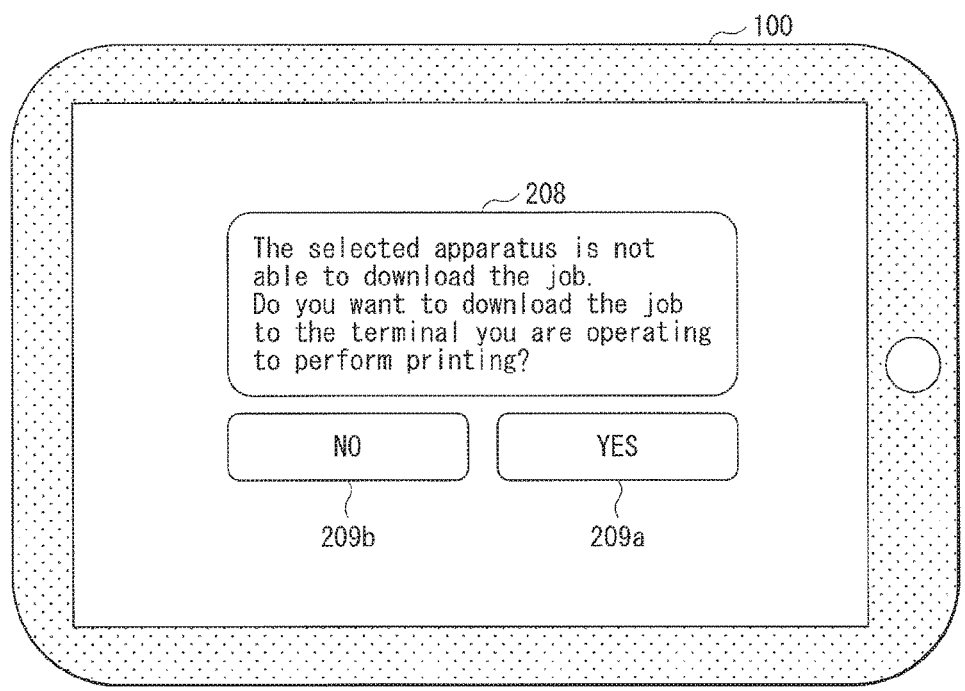
FIG. 19 is a diagram describing an example of a notification screen (a second notification screen) to be displayed on a mobile information terminal according to the fourth example embodiment.

The mobile information terminal 100 in the information processing system according to the fourth example embodiment may further cause, by the function of the application 103A, a second notification screen illustrated in FIG. 19 to be displayed.

FIG. 19 illustrates an example of the second notification screen to be displayed on the mobile information terminal 100 by the function of the application 103A. The second notification screen illustrated in FIG. 19 may include an information display section 208, a "Yes" button 209a as an input section, and a "No" button 209b as another input section. The information display section 208 may display information directed to the user. The second notification screen illustrated in FIG. 19 may be displayed, for example, in a case where the image forming apparatus 110a selected by the user is non-compliant with the could service, i.e., the image forming apparatus 110a selected by the user is a non-cloud-supported apparatus, and the image forming apparatus 110a is therefore unable to acquire the print data from the cloud service, i.e., the external server 130. Non-limiting examples of the foregoing case may include a process in step S1209 in FIG. 22 which will be described later. The user may be allowed to select whether to cause the mobile information terminal 100 to acquire the printing job from the cloud service. The user may be allowed to make the foregoing selection by means of the "Yes" button 209a and the "No" button 209b on the second notification screen illustrated in FIG. 19.

[4.2 Operation]

Figure 20:
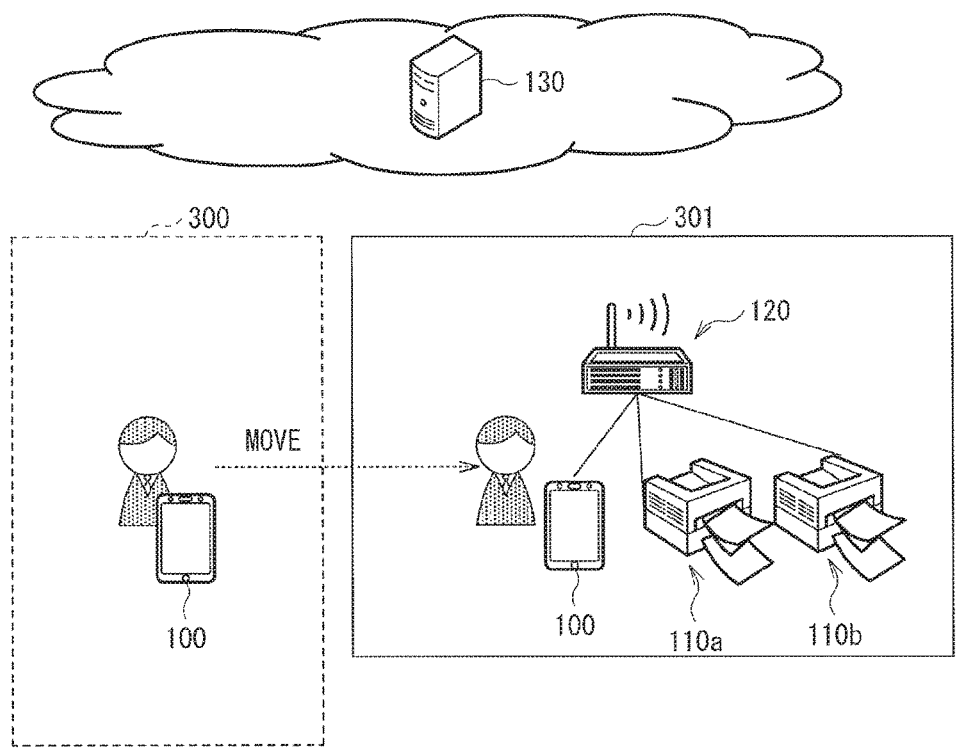
FIG. 20 is a diagram describing an example of a moving state of the mobile information terminal according to the fourth example embodiment.

FIG. 20 illustrates an example of a moving state of the mobile information terminal 100.

According to the fourth example embodiment, the mobile information terminal 100 may register the printing job with the cloud service, i.e., the external server 130, when the user carrying the mobile information terminal 100 makes a reservation for printing in the private network outside region 300. Thereafter, the mobile information terminal 100 may establish connection to the wireless LAN router 120, when the user carrying the mobile information terminal 100 moves from the private network outside region 300 into the private network inside region 301. The private network inside region 301 may be in the private network environment such as the LAN inside the office.

In response to the establishment of the connection to the wireless LAN router 120 as a trigger, the mobile information terminal 100 may search the image forming apparatuses 110a and 110b in the network by means of the function of the application 103A. When the image forming apparatuses 110a and 110b are found in the network, the first notification screen illustrated in FIG. 5 may be displayed on the mobile information terminal 100. When the user agrees to perform the printing and selects, for example, the image forming apparatus 110a, the mobile information terminal 100 may confirm with the image forming apparatus 110a whether the image forming apparatus 110a is able to acquire the printing job from the cloud service. A description is given below of a specific but non-limiting example of a printing reservation process utilizing the cloud service described above.

FIGS. 21 and 22 are each a sequence diagram illustrating an example of an outline of an operation of the information processing system according to the fourth example embodiment.

Referring to FIG. 21, in step S1100, the user may edit a file, shoot a picture, or perform any other operation with the use of the mobile information terminal 100. Thereafter, the user may start up the printing reservation application of the mobile information terminal 100 in steps S1101 and S1200.

On this occasion, the printing reservation process screen illustrated in FIG. 4 may be displayed on the mobile information terminal 100. In step S1102, the user may designate the file which the user wants to print, and instruct to make a reservation for printing, on the printing reservation process screen.

Thereafter, the mobile information terminal 100 may register the printing job with the cloud service in step S1201. In step S1400, the cloud service may send, to the mobile information terminal 100, a response indicating that the printing job has been registered. Thereafter, the mobile information terminal 100 may store reservation information of the printing in the storage 104 in step S1202. Thereafter, in step S1203, the mobile information terminal 100 may monitor and/or detect the change in the network environment.

When any change is brought to the network, the mobile information terminal 100 may search the image forming apparatuses 110a and 110b in step S1204. When the image forming apparatuses 110a and 110b are found in step S1300, the mobile information terminal 100 may perform notification to the user in step S1205. On this occasion, the first notification screen illustrated in FIG. 5 may be displayed on the mobile information terminal 100.

When the user selects to perform the printing on the first notification screen illustrated in FIG. 5, i.e., when the user operates the "Yes" button 204a on the first notification screen illustrated in FIG. 5, in step S1103, the mobile information terminal 100 may display the apparatus selection screen illustrated in FIG. 6, and thereby prompt the user to perform apparatus selection in step S1206. The user may select any of the one or more image forming apparatuses in the apparatus selection section 205 and operate the print button 207 on the apparatus selection screen in step S1104. Thereafter, the mobile information terminal 100 may confirm with the selected image forming apparatus, e.g., the image forming apparatus 110a, whether the image forming apparatus 110a is able to acquire the printing job by utilizing the cloud service, i.e., whether the image forming apparatus 110a is able to perform cloud printing, in step S1207.

Thereafter, referring to FIG. 22, the information processing system may perform the process on the basis of whether the image forming apparatus 110a is able to perform the cloud printing. The image forming apparatus 110a may send a reply indicating whether the image forming apparatus 110a is able to perform the cloud printing, in steps S1301 and S1304. When the image forming apparatus 110a is able to perform the cloud printing, the information processing system may perform a cloud-supported process illustrated in FIG. 22. When the image forming apparatus 110a is unable to perform the cloud printing, the information processing system may perform a non-cloud-supported process illustrated in FIG. 22.

When the image forming apparatus 110a is able to perform the cloud printing, the mobile information terminal 100 may instruct the image forming apparatus 110a to perform the printing in step S1208. The image forming apparatus 110a may acquire the printing job from the cloud service in steps S1302, S1401, and S1402, and perform printing of the acquired printing job in step S1303.

In contrast, when the image forming apparatus 110a is unable to perform the cloud printing in step S1304, the mobile information terminal 100 may perform notification to the user in step S1209. On this occasion, the mobile information terminal 100 may display the second notification screen illustrated in FIG. 19, and thereby prompt the user to select whether to acquire the printing job from the cloud service by the use of the mobile information terminal 100. When the user operates the "Yes" button 209a on the second notification screen in step S1105, the mobile information terminal 100 may acquire the printing job from the cloud service in steps S1210, S1403, and S1404. Thereafter, the mobile information terminal 100 may transmit the acquired printing job to the image forming apparatus 110a in step S1211. The image forming apparatus 110a may perform printing of the acquired printing job in step S1305.

[4.3 Effects]

As described above, according to the fourth example embodiment, it is possible for the user to make a reservation for printing without being aware of the network environment, for example, without being aware of whether the mobile information terminal 100 is currently connected to the network, or without being aware of whether an image forming apparatus is present in the network. In addition, it is possible to prevent the user from forgetting to perform the printing by searching the image forming apparatuses 110a and 110b in the network when the network environment is changed in accordance with the movement of the user, and performing the notification to the user. Moreover, even when the image forming apparatuses 110a and 110b in the network are not compliant with the cloud service, i.e., the external server 130, it is possible to perform the printing by causing the mobile information terminal 100 to acquire the printing job from the cloud service.

Configurations, operations, and effects of the information processing system according to the fourth example embodiment other than those described above may be substantially similar to those of the information processing system according to any of the foregoing first to third example embodiments.

[5. Fifth Example Embodiment]

A description is given next of an information processing system according to a fifth example embodiment of the technology. It is to be noted that components of the information processing system according to the fifth example embodiment that are substantially similar to those according to any of the foregoing first to fourth example embodiments may be denoted with the same numerals, and will not be described further where appropriate.

[5.1 Configuration]

The information processing system according to the fifth example embodiment may have a function and a configuration that are both substantially similar to those of the information processing system according to the fourth example embodiment, except that a function related to the cloud service is partially different from that according to the fourth example embodiment.

The information processing system according to the fifth example embodiment may have a network configuration similar to that of the information processing system according to the foregoing fourth example embodiment illustrated in FIG. 18. It is to be noted that, however, the image forming apparatus 110a and the image forming apparatus 110b in the information processing system according to the fifth example embodiment may have a function of performing mutual communication with each other via the communication processor 116 illustrated in FIG. 2.

According to the fifth example embodiment, the application 103A of the mobile information terminal 100 may have a function as a controller. When the plurality of image forming apparatuses serving as the information processing apparatuses include the image forming apparatus that is unable to acquire the printing job from the external server 130, the controller may cause the image forming apparatus, in the plurality of image forming apparatuses, that is able to acquire the printing job from the external server 130 to acquire the printing job from the external server 130.

Figure 23:
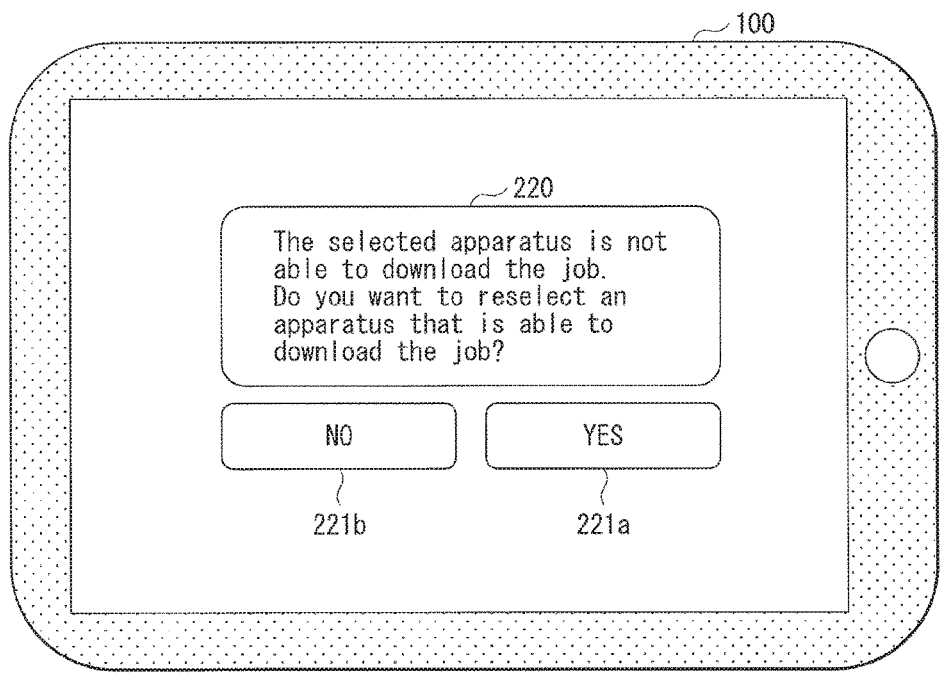
FIG. 23 is a diagram describing an example of a notification screen (a third notification screen) to be displayed on a mobile information terminal according to a fifth example embodiment of the technology.

Further, the mobile information terminal 100 in the information processing system according to the fifth example embodiment may have a function of displaying a third notification screen illustrated in FIG. 23.

FIG. 23 illustrates an example of the third notification screen to be displayed on the mobile information terminal 100 by the function of the application 103A. The third notification screen illustrated in FIG. 23 may include an information display section 220, a "Yes" button 221a as an input section, and a "No" button 221b as another input section. The information display section 220 may display information directed to the user. The third notification screen illustrated in FIG. 23 may be displayed, for example, in a case where the image forming apparatus 110a selected by the user is non-compliant with the could service, i.e., the image forming apparatus 110a selected by the user is a non-cloud-supported apparatus, and the image forming apparatus 110a is therefore unable to acquire the print data from the cloud service, i.e., the external server 130. Non-limiting examples of the foregoing case may include a process in step S1220 in FIG. 25 which will be described later. The user may be allowed to select whether to reselect the image forming apparatus that is able to perform the cloud printing. The user may be allowed to make the foregoing selection by means of the "Yes" button 221a and the "No" button 221b on the third notification screen illustrated in FIG. 23.

Figure 24:
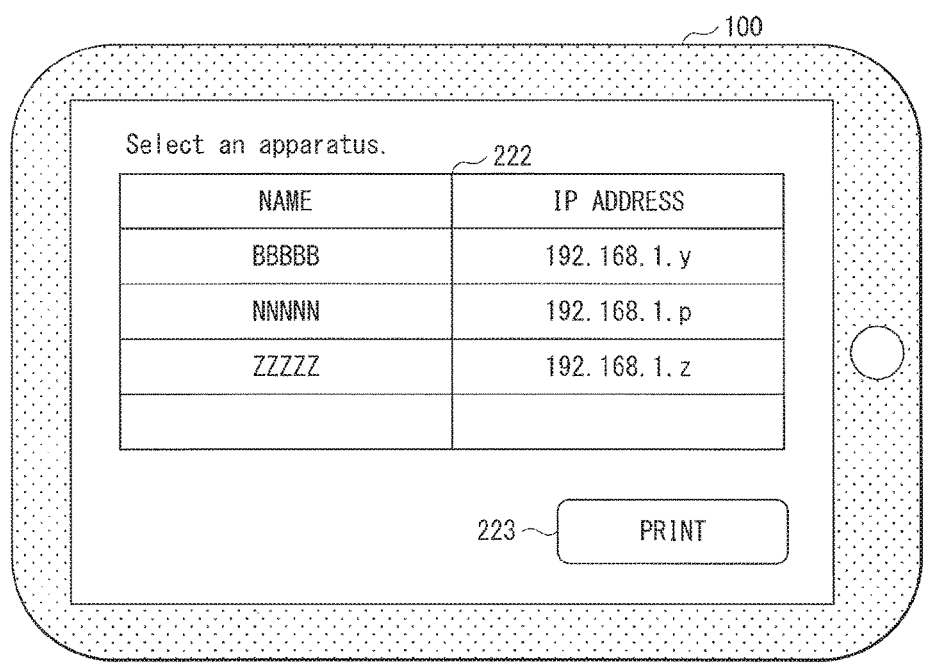
FIG. 24 is a diagram describing an example of an apparatus selection screen to be displayed on the mobile information terminal according to the fifth example embodiment.

FIG. 24 illustrates an example of an apparatus selection screen to be displayed on the mobile information terminal 100 by the function of the application 103A. The apparatus selection screen illustrated in FIG. 24 may be displayed, for example, when the "Yes" button 221a is selected on the third notification screen illustrated in FIG. 23.

The apparatus selection screen illustrated in FIG. 24 may include an apparatus selection section 225 and a print button 223. The print button 223 may be directed to causing the image forming apparatus selected by means of the apparatus selection section 225 to start the printing. One or more image forming apparatuses that are present in the network and are able to perform the cloud printing may be displayed in the apparatus selection section 225.

[5.2 Operation]

The information processing system according to the fifth example embodiment may perform an operation in accordance with the sequence illustrated in FIGS. 21 and 22, in a manner substantially similar to that of the information processing system according to the foregoing fourth example embodiment. It is to be noted that, however, the operation performed by the information processing system according to the fifth example embodiment may be different from that of the information processing system according to the fourth example embodiment in part of operations in step S1207 and the subsequent steps in FIGS. 21 and 22. A description is given below of the part of the operations that is different from the operation of the information processing system according to the foregoing fourth example embodiment.

Figure 25:
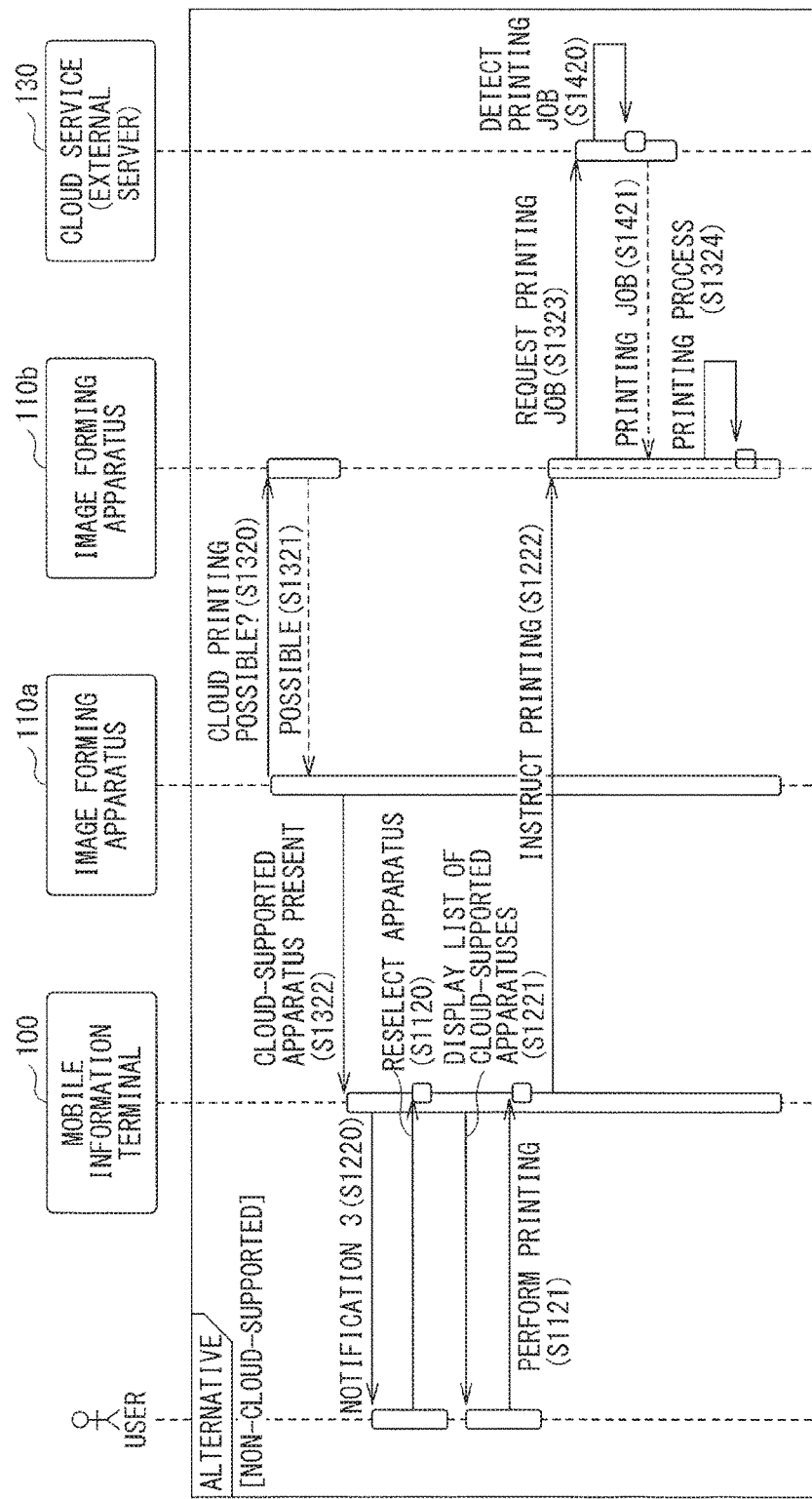
FIG. 25 is a sequence diagram illustrating an example of an outline of an operation of the information processing system according to the fifth example embodiment.

FIG. 25 is a sequence diagram illustrating an example of an outline of the operation of the information processing system according to the fifth example embodiment.

In step S1207 illustrated in FIGS. 21 and 22, the mobile information terminal 100 may confirm with the selected image forming apparatus, e.g., the image forming apparatus 110a, whether the selected image forming apparatus, e.g., the image forming apparatus 110a, is able to acquire the printing job by utilizing the cloud service, i.e., is able to perform the cloud printing. On this occasion, when the image forming apparatus 110a is unable to perform the cloud printing, the image forming apparatus 110a may confirm with another image forming apparatus 110b whether the image forming apparatus 110b is able to perform the cloud printing, in steps S1320 and S1321. Thereafter, in step S1322, the image forming apparatus 110a may notify the mobile information terminal 100 of a result of the confirmation. FIG. 25 illustrates a non-limiting example case where the image forming apparatus 110b other than the image forming apparatus 110a is able to perform the cloud printing.

When the image forming apparatus 110b other than the image forming apparatus 110a is able to perform the cloud printing, the mobile information terminal 100 may display the third notification screen illustrated in FIG. 23 in step S1220. When the user operates the "Yes" button 221a and instruct to reselect the image forming apparatus on the third notification screen in step S1120, the mobile information terminal 100 may display a list of the image forming apparatuses compliant with the cloud service illustrated in FIG. 24, in step S1221.

The user may select the image forming apparatus 110b and operate the print button 223 on the apparatus selection screen illustrated in FIG. 24 in step S1121. In response thereto, the mobile information terminal 100 may instruct the image forming apparatus 110b to perform the printing in step S1222. The image forming apparatus 110b may acquire the printing job from the cloud service in steps S1323, S1420, and S1421, and perform printing of the acquired printing job in step S1324.

It is to be noted that, when the image forming apparatus that is able to perform the cloud printing is absent as a result of the confirmation process in step S1320, the sequence including the processes in step S1304 and the subsequent steps in FIG. 22 may be performed.

The description above refers to an example in which the image forming apparatus other than the image forming apparatus 110a includes only one image forming apparatus, i.e., the image forming apparatus 110b. However, an operation similar to that described above may be performed also in a case where the image forming apparatus other than the image forming apparatus 110a includes one or more image forming apparatuses, i.e., image forming apparatuses 110c, 110d, and so forth, in addition to the image forming apparatus 110b.

[5.3 Effects]

As described above, according to the fifth example embodiment, even when the image forming apparatus 110a selected by the user is unable to acquire the printing job from the cloud service, it is possible to cause the image forming apparatus 110b, other than the image forming apparatus 110a, that is able to acquire the printing job from the cloud service to perform the printing.

Configurations, operations, and effects of the information processing system according to the fifth example embodiment other than those described above may be substantially similar to those of the information processing system according to any of the foregoing first to fourth example embodiments.

[6. Sixth Example Embodiment]

A description is given next of an information processing system according to a sixth example embodiment of the technology. It is to be noted that components of the information processing system according to the sixth example embodiment that are substantially similar to those according to any of the foregoing first to fifth example embodiments may be denoted with the same numerals, and will not be described further where appropriate.

[6.1 Configuration]

The information processing system according to the sixth example embodiment may have a function and a configuration that are both substantially similar to those of the information processing system according to the fourth example embodiment, except that a function related to the cloud service is partially different from that according to the fourth example embodiment.

According to the sixth example embodiment, the application 103A of the mobile information terminal 100 may have a function as a controller. The controller may perform a confirmation process and a display process. The confirmation process may confirm with each of the plurality of image forming apparatuses each serving as the information processing apparatus whether the relevant image forming apparatus is able to acquire the printing job from the external server 130. The display process may cause a result of the confirmation to be displayed.

Figure 26:
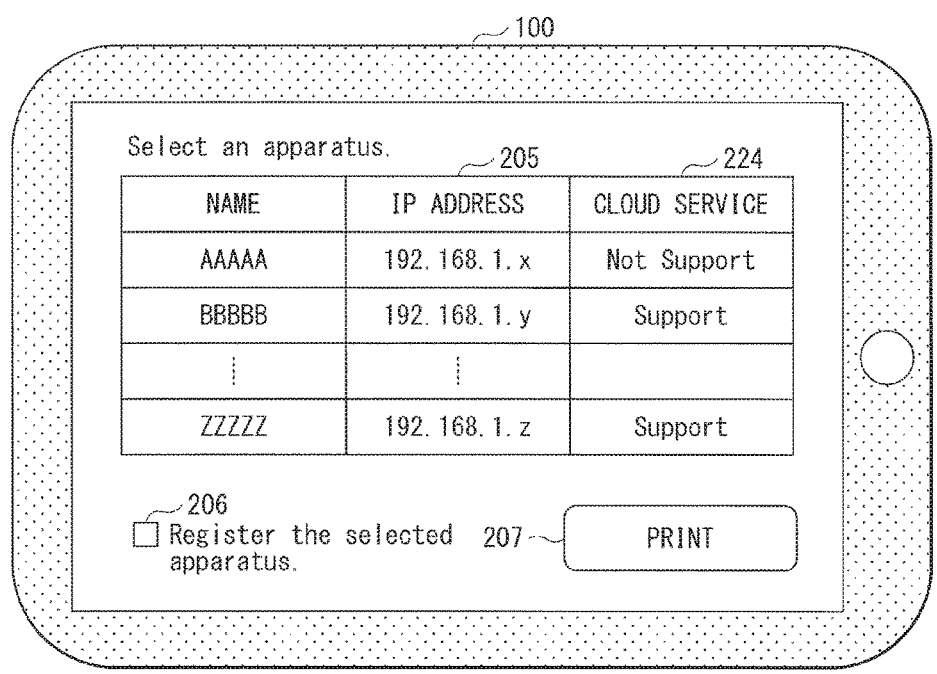
FIG. 26 is a diagram describing an example of an apparatus selection screen to be displayed on a mobile information terminal according to a sixth example embodiment of the technology.

The mobile information terminal 100 in the information processing system according to the sixth example embodiment may display, by the function of the application 103A, an apparatus selection screen illustrated in FIG. 26 in place of the apparatus selection screen illustrated in FIG. 6.

FIG. 26 illustrates an example of the apparatus selection screen to be displayed on the mobile information terminal 100 by the function of the application 103A in the information processing system according to the sixth example embodiment. The apparatus selection screen illustrated in FIG. 26 may be displayed, for example, upon the process in step S1206 illustrated in FIG. 27 described later. The apparatus selection screen illustrated in FIG. 26 may be different from the apparatus selection screen illustrated in FIG. 6 in part of display in the apparatus selection section 205. The apparatus selection screen illustrated in FIG. 26 may be additionally provided with a display column 224 in the apparatus selection section 205. The display column 224 may display information regarding whether each of the image forming apparatuses supports the cloud service, i.e., whether each of the image forming apparatuses is able to perform the cloud printing.

[6.2 Operation]

The information processing system according to the sixth example embodiment may perform an operation in accordance with the sequence illustrated in FIGS. 21 and 22, in a manner substantially similar to that of the information processing system according to the foregoing fourth example embodiment. It is to be noted that, however, the operation performed by the information processing system according to the sixth example embodiment may be different from that of the information processing system according to the fourth example embodiment in part of operations in step S1103 and the subsequent steps illustrated in FIG. 21. A description is given below of the part of the operations that is different from the operation of the information processing system according to the foregoing fourth example embodiment.

Figure 27:
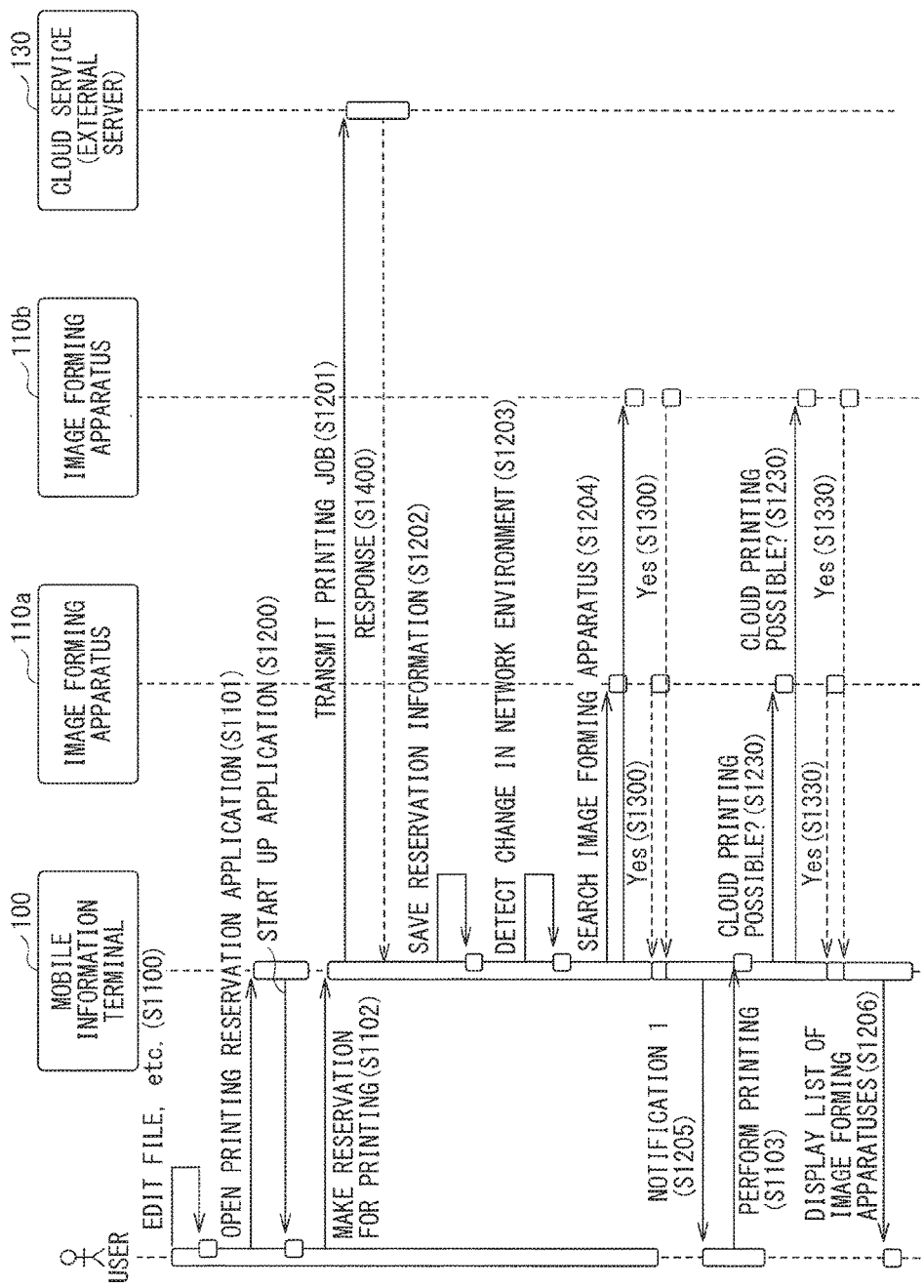
FIG. 27 is a sequence diagram illustrating an example of an outline of an operation of an information processing system according to the sixth example embodiment.

FIG. 27 is a sequence diagram illustrating an example of an outline of the operation of the information processing system according to the sixth example embodiment.

When the user selects, on the first notification illustrated in FIG. 5, to perform the printing, i.e., when the user operates the "Yes" button 204a on the first notification illustrated in FIG. 5, in step S1103, the mobile information terminal 100 may confirm with each of the image forming apparatuses 110a and 110b in the network whether the relevant one of the image forming apparatuses 110a and 110b is able to acquire the printing job from the cloud service, i.e., the external server 130, in steps S1230 and S1330. In other words, the mobile information terminal 100 may confirm with each of the image forming apparatuses 110a and 110b in the network whether the relevant one of the image forming apparatuses 110a and 110b is able to perform the cloud printing, in steps S1230 and S1330. The mobile information terminal 100 may display the apparatus selection screen illustrated in FIG. 26 that reflects a result of the foregoing confirmation, and thereby prompt the user to perform apparatus selection in step S1206.

The description above refers to an example in which the image forming apparatus other than the image forming apparatus 110a includes only one image forming apparatus, i.e., the image forming apparatus 110b. However, an operation similar to that described above may be performed also in a case where the image forming apparatus other than the image forming apparatus 110a includes one or more image forming apparatuses, i.e., image forming apparatuses 110c, 110d, and so forth, in addition to the image forming apparatus 110b.

[6.3 Effects]

As described above, according to the sixth example embodiment, it is possible for the user to know, at the timing of selecting the image forming apparatus, whether the image forming apparatus is able to acquire the printing job from the cloud service.

Configurations, operations, and effects of the information processing system according to the sixth example embodiment other than those described above may be substantially similar to those of the information processing system according to any of the foregoing first to fourth example embodiments.

[7. Seventh Example Embodiment]

A description is given next of an information processing system according to a seventh example embodiment of the technology. It is to be noted that components of the information processing system according to the seventh example embodiment that are substantially similar to those according to any of the foregoing first to sixth example embodiments may be denoted with the same numerals, and will not be described further where appropriate.

[7.1 Configuration]

The information processing system according to the seventh example embodiment may have a function and a configuration that are both substantially similar to those of the information processing system according to the fourth example embodiment, except that a function related to the cloud service is partially different from that according to the fourth example embodiment.

According to the seventh example embodiment, the plurality of image forming apparatuses each serving as the information processing apparatus may include one or more first image forming apparatuses each serving as a first information processing apparatus, and one or more second image forming apparatuses each serving as a second information processing apparatus. The one or more first image forming apparatuses may each be unable to acquire the printing job from the external server 130. The one or more second image forming apparatuses may each be able to acquire the printing job from the external server 130. The application 103A of the mobile information terminal 100 may have a function as a controller. The controller may cause any of the second image forming apparatuses, in place of the first image forming apparatus, to acquire the printing job from the external server 130, and cause the printing job acquired by the second image forming apparatus to be transmitted to the first image forming apparatus.

The information processing system according to the seventh example embodiment may have a network configuration similar to that of the information processing system according to the foregoing fourth example embodiment illustrated in FIG. 18. It is to be noted that, however, the image forming apparatus 110a and the image forming apparatus 110b in the information processing system according to the seventh example embodiment may have a function of performing mutual communication with each other via the communication processor 116 illustrated in FIG. 2.

[7.2 Operation]

The information processing system according to the seventh example embodiment may perform an operation in accordance with the sequence illustrated in FIGS. 21 and 22, in a manner substantially similar to that of the information processing system according to the foregoing fourth example embodiment. It is to be noted that, however, the operation performed by the information processing system according to the seventh example embodiment may be different from that of the information processing system according to the fourth example embodiment in part of operations in step S1207 and the subsequent steps illustrated in FIGS. 21 and 22. A description is given below of the part of the operations that is different from the operation of the information processing system according to the foregoing fourth example embodiment.

Figure 28:
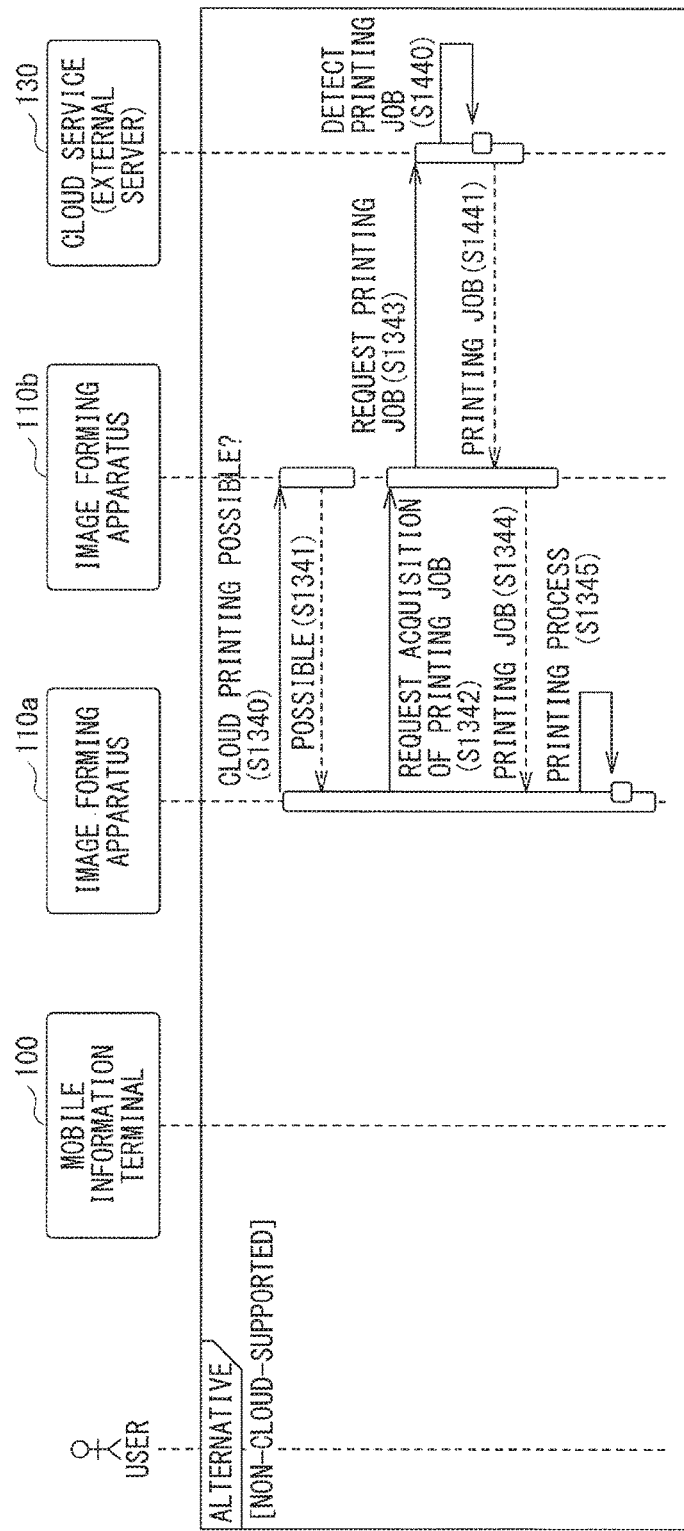
FIG. 28 is a sequence diagram illustrating an example of an outline of an operation of an information processing system according to a seventh example embodiment of the technology.

FIG. 28 is a sequence diagram illustrating an example of an outline of the operation of the information processing system according to the seventh example embodiment. A description is given below referring to an example case where a plurality of image forming apparatuses 110b, 110c, 110d, and so forth are present in addition to the image forming apparatus 110a. However, in FIG. 28, only the single image forming apparatus 110b is illustrated as representing the image forming apparatuses 110b, 110c, 110d, and so forth other than the image forming apparatus 110a. The image forming apparatus 110a and each of the other image forming apparatus 110b, 110c, 110d, and so forth may have a function of performing mutual communication with each other via the communication processor 116 illustrated in FIG. 2.

In step S1207 illustrated in FIGS. 21 and 22, the mobile information terminal 100 may confirm with the selected image forming apparatus, e.g., the image forming apparatus 110a, whether the selected image forming apparatus, e.g., the image forming apparatus 110a, is able to acquire the printing job by utilizing the cloud service, i.e., is able to perform the cloud printing. On this occasion, when the image forming apparatus 110a is unable to perform the cloud printing, the image forming apparatus 110a may confirm with the other image forming apparatuses 110b, 110c, 110d, and so forth in order whether the relevant image forming apparatus is able to perform the cloud printing, in steps S1340.

When one of the image forming apparatuses other than the image forming apparatus 110a, e.g., the image forming apparatus 110b, that is able to acquire the printing job is detected in step S1341, the confirmation with the information apparatuses other than the image forming apparatuses 110a and 110b, e.g., the image forming apparatuses 110c, 110d, and so forth, may be ended.

Thereafter, in step S1342, the image forming apparatus 110a may make a request for the other image forming apparatus 110*b* that is able to acquire the printing job. The other image forming apparatus 110*b* may acquire the printing job from the cloud service in place of the image forming apparatus 110*a* in steps S1343, S1440, and S1441. Thereafter, the other image forming apparatus 110*b* may transmit the printing job to the image forming apparatus 110*a* in step S1344.

Thereafter, in step S1345, the image forming apparatus 110*a* may perform printing of the printing job received from the other image forming apparatus 110*b*.

[7.3 Effects]

As described above, according to the seventh example embodiment, even when the image forming apparatus 110*a* selected by the user is unable to acquire the printing job from the cloud service, i.e., the external server 130, the printing job may be acquired via the image forming apparatus 110*b* other than the image forming apparatus 110*a*. This makes it possible to cause the image forming apparatus 110*a* designated by the user to perform the printing, without causing the user to have the trouble of operating the mobile information terminal 100, for example, to thereby reselect the image forming apparatus.

Configurations, operations, and effects of the information processing system according to the seventh example embodiment other than those described above may be substantially similar to those of the information processing system according to any of the foregoing first to fourth example embodiments.

[8. Other Example Embodiments]

The technology is not limited to the example embodiments described above, and is modifiable in various ways.

The foregoing example embodiments have been described referring to an example case where the information processing apparatus is the image forming apparatus; however, the information processing apparatus is not limited thereto. In one example embodiment, the information processing apparatus may be a multi-function peripheral (MPF), a copying machine, etc. In another example embodiment, the information processing apparatus may be a computer terminal.

According to any of the foregoing example embodiments, the mobile information terminal 100 may perform the notification to the user when the image forming apparatus is found. However, in one example embodiment, a notification may be displayed in accordance with the elapse of time, for example. The user may be allowed to input a time period as a guide upon making a reservation for printing, for example. In another example embodiment, the notification may be displayed upon a particular schedule, in association with, for example, a calendar application. In this case, for example, the notification may be displayed a certain time period after a scheduled time for returning to the office.

According to the foregoing first example embodiment, the user may be allowed to select the image forming apparatus 110 after the image forming apparatus 110 is found in the network. However, in one example embodiment, the list of the image forming apparatuses may not be displayed, and the image forming apparatus 110 that has been already registered may be directly caused to perform the printing.

In the foregoing third example embodiment, the setting of the printing control may be stored in or attached to the file which the user wants to print, for example. In this case, a comparison may be made between the SSID stored in the file and the SSID of the network which the mobile information terminal 100 joins, to thereby perform the printing control.

Moreover, the data process to be performed by the information processing apparatus is not limited to the printing process. The data process to be performed by the information processing apparatus may involve only saving of the data. Moreover, the data information of the data process to be transmitted by the mobile information terminal 100 may be data other than the printing job, i.e., the print data. In this case, in the foregoing third example embodiment, a factor such as how to save the data and a compression rate of the data may be changed in accordance with the connection base. In an example case where the data is image data, a factor such as resolution may be changed in accordance with the connection base.

Moreover, the foregoing example embodiments have been described referring to an example case where the application 103A of the mobile information terminal 100 has the function as the transmission reservation unit, and the "reservation for transmission", i.e., the "reservation for printing" is made first by the use of the mobile information terminal 100. The transmission reservation unit may make a reservation for transmission of the print data to the information processing apparatus. This is, however, non-limiting. In one example embodiment, the application 103A of the mobile information terminal 100 may have a function as a printing executing unit, i.e., a process execution unit. The printing executing unit may cause the information processing apparatus to execute the printing of the printing data, without first making the "reservation for transmission", i.e., the "reservation for printing". For example, the first process of making the "reservation for transmission", i.e., the "reservation for printing" according to any of the foregoing example embodiments may be considered as a process of "printing execution" as of the regular printing. In this case, when the connectable base is not detected, the printing may be suspended, i.e., a reservation for printing may be made.

When the application 103A has the foregoing function of the process execution unit, for example, instead of the transmission reservation unit in the foregoing first example embodiment, the process execution unit may have a function as an apparatus registering unit. The apparatus registering unit may allow for registration of the image forming apparatus 110, of the plurality of image forming apparatuses 110, which is caused to execute the printing of the print data. The application 103A may cause, for example, the apparatus selection screen illustrated in FIG. 6 to be displayed through the function as the apparatus selection unit and the function as the apparatus registering unit, in a manner similar to that in the foregoing first example embodiment. When the plurality of image forming apparatuses connected to the connectable base include the image forming apparatus that has already been registered by the apparatus registering unit, the application 103A may not necessarily perform a display process and a selection process. The display process may display the list of the image forming apparatuses 110 that are connected to the connectable base. The selection process may allow for selection of the image forming apparatus 110, of the plurality of image forming apparatuses 110, which is caused to execute the printing of the print data.

Moreover, when the application 103A has the foregoing function of the process execution unit, for example, in the foregoing third example embodiment, the process execution unit may cause the printing of the print data to be executed, as the data process with respect to the image forming apparatus connected to at least one of the plurality of connection bases. In this case, the application 103A may have a function as a transmitter. The transmitter may acquire the limitation information corresponding to the connectable base from the limitation information storage 104A, when the connectable base is detected by the base detector. Further, the transmitter may transmit the data of the data process that is caused to be executed by the process execution unit, to the image forming apparatus connected to the connectable base, via the connectable base. The transmitter may so perform the foregoing transmission of the data of the data process that the process based on the limitation information is performed by the image forming apparatus connected to the connectable base.

Moreover, when the data of the data process that is caused to be in a suspended state in the mobile information terminal 100 is to be transferred to the image forming apparatus, the mobile information terminal 100 may transmit the data of the data process to the image forming apparatus on the basis of a determination made by the mobile information terminal 100 of its own. Alternatively, upon the foregoing transfer of the data of the data process, the image forming apparatus may acquire the data of the data process on the basis of a determination made by the image forming apparatus of its own. For example, according to any of the foregoing example embodiments, the data of the data process, i.e., the printing job, may be transmitted from the image forming apparatus; however, this is non-limiting. In one example embodiment, however, the data of the data process may be acquired by the image forming apparatus. In one example embodiment, the application 103A may have the foregoing function of the process execution unit. In this case, when the printing is suspended, i.e., when the reservation for the printing is made, the application 103A may acquire, from the image forming apparatus that has become connectable, the limitation information and the data of the data process in the suspended state.

Moreover, in the foregoing third example embodiment, the connection base may include a corporate network, for example. The printing job of an important file may be attached with an SSID of the corporate network. A limitation may be so set thereby that printing of the important file is allowed to be executed by the use of the mobile information terminal 100 only when the mobile information terminal 100 is connected to the corporate network.

Moreover, in any of the foregoing fourth to seventh example embodiments, examples of the method of confirming whether each of the image forming apparatuses 110a and 110b is able to acquire the printing job from the cloud service, i.e., the external server 130, may include: to confirm whether each of the image forming apparatuses 110a and 110b has a function of establishing connection with the cloud service; to actually establish connection with the external server 130 by the use of the reservation information of the printing; and to make an attempt to acquire the printing job from the external server 130. The timing for acquiring the printing job from the cloud service may be also changeable in accordance with the foregoing confirming method.

Moreover, in the foregoing fourth to seventh example embodiments, a process of inputting authentication information directed to utilization of the cloud service may be additionally provided. The foregoing sixth example embodiment has been described referring to an example in which whether the image forming apparatus is able to acquire the printing job from the cloud service is confirmed after confirming whether the user wants to perform the printing, by means of the first notification screen illustrated in FIG. 5. In one example, however, whether the image forming apparatus is able to acquire the printing job from the cloud service may be confirmed before displaying the first notification screen. Moreover, in one example embodiment, only the data of the image forming apparatus that is able to acquire the printing job may be displayed on the apparatus selection screen illustrated in FIG. 26.

Moreover, the foregoing seventh example embodiment has been described referring to an example where the detection of the image forming apparatus that is able to acquire the printing job from the cloud service may bring to an end the confirmation of other image forming apparatuses. In one example embodiment, however, whether the image forming apparatus is able to perform the cloud printing may be confirmed with all of the image forming apparatuses, and the image forming apparatus to which a request is made to acquire the printing job may be determined on the basis of information such as an operating state of the image forming apparatus or the location of the image forming apparatus.

Furthermore, the technology encompasses any possible combination of some or all of the various embodiments and the modifications described herein and incorporated herein.

It is possible to achieve at least the following configurations from the above-described example embodiments of the technology.

(1)

An information terminal apparatus including:

an associating processor that associates each of connection bases with both base identification information and limitation information regarding a data process, the base identification information identifying corresponding one of the connection bases;

a process execution circuitry that causes an information processing apparatus to execute the data process, the information processing apparatus being connected to at least one of the connection bases;

a base detector that detects that any of the connection bases becomes a connectable base; and a controller that causes, when the connectable base is detected by the base detector, the information processing apparatus connected to the connectable base to perform the data process based on the limitation information.

(2)

The information terminal apparatus according to (1), further including:

a limitation information storage that stores the limitation information associated with corresponding one of the connection bases; and a first transmitter that, when the connectable base is detected by the base detector, acquires the limitation information associated with the connectable base from the limitation information storage, and performs transmission of data of the data process to the information processing apparatus via the connectable base, the first transmitter performing the transmission of the data of the data process to thereby cause the information processing apparatus connected to the connectable base to perform a process based on the limitation information, the data process being caused, by the process execution circuitry, to be executed.

(3)

The information terminal apparatus according to (2), further including an apparatus selector, in which the information processing apparatus includes a plurality of information processing apparatuses, the information processing apparatuses are connected to at least one of the connection bases, and the apparatus selector performs a display process and a selection process when the connectable base to which the information processing apparatuses are connected is detected by the base detector, the display process displaying a list of the information processing apparatuses connected to the connectable base, the selection process allowing for selection of the information processing apparatus, of the plurality of information processing apparatuses, to which the data of the data process is to be transmitted.

(4)

The information terminal apparatus according to (3), in which the process execution circuitry includes an apparatus registering circuitry that allows for registration of the information processing apparatus, of the plurality of information processing apparatuses, which is caused to execute the data process.

(5)

The information terminal apparatus according to (4), in which, when the plurality of information processing apparatuses connected to the connectable base include the information processing apparatus registered by the apparatus registering circuitry, the apparatus selector refrains from performing both the display process and the selection process.

(6)

The information terminal apparatus according to (1), in which the information processing apparatus includes a communication processor that serves as the connection base.

(7)

The information terminal apparatus according to (6), in which the connection base includes any of the communication processor of the information processing apparatus and a private network.

(8)

The information terminal apparatus according to (1), further including a second transmitter that attaches the limitation information to the data of the data process, and transmits, to an external server, the data of the data process attached with the limitation information, in which the controller causes, when the connectable base is detected by the base detector, the information processing apparatus connected to the connectable base to perform acquisition of the data of the data process from the external server, the controller causing the information processing apparatus to perform the acquisition of the data of the data process to thereby cause the information processing apparatus connected to the connectable base to perform a process based on the limitation information, the data process being caused, by the processing executing circuitry, to be executed.

(9)

The information terminal apparatus according to (8), in which the information processing apparatus includes a plurality of information processing apparatuses, the information processing apparatuses are connected to at least one of the connection bases, and the controller causes, when the plurality of information processing apparatuses include the information processing apparatus that is unable to acquire the data of the data process from the external server, the information processing apparatus, of the plurality of information processing apparatuses, that is able to acquire the data of the data process from the external server to acquire the data of the data process from the external server.

(10)

The information terminal apparatus according to (8), in which the information processing apparatus includes a plurality of information processing apparatuses, the information processing apparatuses are connected to at least one of the connection bases, and the controller performs a confirmation process on each of the information processing apparatuses, and performs a process that displays a result of the confirmation process, the confirmation process confirming whether each of the information processing apparatuses is able to acquire the data of the data process from the external server.

(11)

The information terminal apparatus according to (8), in which the information processing apparatus includes a plurality of information processing apparatuses, the information processing apparatuses are connected to at least one of the connection bases, the information processing apparatuses include one or more first information processing apparatuses and one or more second information processing apparatuses, the one or more first information processing apparatuses each being unable to acquire the data of the data process from the external server, the one or more second information processing apparatuses each being able to acquire the data of the data process from the external server, and the controller causes any of the one or more second information processing apparatuses to acquire the data of the data process from the external server in place of any of the one or more first information processing apparatuses, and causes the data of the data process acquired by any of the one or more second information processing apparatuses to be transmitted to any of the one or more first information processing apparatuses.

(12)

The information terminal apparatus according to any one of (1) to (11), in which the information processing apparatus includes a printing unit, the data of the data process includes print data, and the limiting information includes information regarding a printing process.

(13)

An information processing system including:

an information processing apparatus; and an information terminal apparatus that causes the information processing apparatus to perform a data process, the information terminal apparatus including an associating processor that associates each of connection bases with both base identification information and limitation information regarding the data process, the base identification information identifying corresponding one of the connection bases, a process execution circuitry that causes the information processing apparatus to execute the data process, the information processing apparatus being connected to at least one of the connection bases, a base detector that detects that any of the connection bases becomes a connectable base, and a controller that causes, when the connectable base is detected by the base detector, the information processing apparatus connected to the connectable base to perform the data process based on the limitation information.

(14)

An information processing method including:

causing an information terminal apparatus to associate each of connection bases with both base identification information and limitation information regarding a data process, the base identification information identifying corresponding one of the connection bases:

causing the information terminal apparatus to detect that any of the connection bases becomes a connectable base;

causing the information terminal apparatus to suspend the data process which is caused to be executed by an information processing apparatus, the information processing apparatus being connected to at least one of the connection bases; and causing, when the connectable base is detected, the information processing apparatus connected to the connectable base to perform the data process based on the limitation information.

According to any of the information terminal apparatus, the information processing system, and the information processing method according to example embodiments of the technology, the process based on the limitation information is performed by the information processing apparatus connected to the connectable base when the connectable base is detected. Hence, it is possible to perform a process with high usability for a user.

Each of the controller 103 illustrated in FIG. 2 and the controller 113 illustrated in FIG. 3 is implementable by circuitry that includes at least one application specific integrated circuit (ASIC), at least one semiconductor integrated circuit, and/or at least one field programmable gate array (FPGA). Non-limiting example of the at least one semiconductor integrated circuit may include at least one processor such as a central processing unit (CPU). At least one processor is configurable to perform all or a part of functions of each of the controller 103 illustrated in FIG. 2 and the controller 113 illustrated in FIG. 3, by reading instructions from at least one machine readable non-transitory tangible medium. Such a medium may take many forms. Non-limiting examples of the form of such a medium may include any type of magnetic medium such as a hard disk, any type of optical medium such as a CD or a DVD, any type of semiconductor memory (i.e., semiconductor circuit) such as a volatile memory or a non-volatile memory. Non-limiting examples of the volatile memory may include a DRAM and a SRAM. Non-limiting examples of the nonvolatile memory may include a ROM and a NVRAM. The ASIC is an integrated circuit (IC) customized to perform all or a part of the functions of each of the controller 103 illustrated in FIG. 2 and the controller 113 illustrated in FIG. 3. The FPGA is an integrated circuit designed to be configured after manufacturing in order to perform all or a part of the functions of each of the controller 103 illustrated in FIG. 2 and the controller 113 illustrated in FIG. 3.

What is claimed is:

1. An information terminal apparatus comprising:
    an associating processor that associates each of connection bases with both base identification information and limitation information regarding a data process, the base identification information identifying corresponding one of the connection bases;
    a process execution circuitry that causes an information processing apparatus to execute the data process, the information processing apparatus being connected to at least one of the connection bases;
    a transmission reservation circuitry that makes a transmission reservation of data of the data process;
    a base detector that starts, when the transmission reservation of the data is made by the transmission reservation circuitry, a detection as to whether any of the connection bases becomes a connectable base, and determines, when the connectable base is detected and on a basis of the limitation information, whether to search the information processing apparatus that is connected to the detected connectable base; and
    a controller that causes, when the connectable base is detected and the information processing apparatus is searched by the base detector, the information processing apparatus connected to the connectable base to perform the data process based on the limitation information.

2. The information terminal apparatus according to claim 1, further comprising:
    a limitation information storage that stores the limitation information associated with corresponding one of the connection bases; and
    a first transmitter that, when the connectable base is detected by the base detector, acquires the limitation information associated with the connectable base from the limitation information storage, and performs transmission of the data of the data process to the information processing apparatus via the connectable base, the first transmitter performing the transmission of the data of the data process to thereby cause the information processing apparatus connected to the connectable base to perform a process based on the limitation information, the data process being caused, by the process execution circuitry, to be executed.

3. The information terminal apparatus according to claim 2, further comprising an apparatus selector, wherein
    the information processing apparatus comprises a plurality of information processing apparatuses,
    the information processing apparatuses are connected to at least one of the connection bases, and
    the apparatus selector performs a display process and a selection process when the connectable base to which the information processing apparatuses are connected is detected by the base detector, the display process displaying a list of the information processing apparatuses connected to the connectable base, the selection process allowing for selection of the information processing apparatus, of the plurality of information processing apparatuses, to which the data of the data process is to be transmitted.

4. The information terminal apparatus according to claim 3, wherein the process execution circuitry includes an apparatus registering circuitry that allows for registration of the information processing apparatus, of the plurality of information processing apparatuses, which is caused to execute the data process.

5. The information terminal apparatus according to claim 4, wherein, when the plurality of information processing apparatuses connected to the connectable base include the information processing apparatus registered by the apparatus registering circuitry, the apparatus selector refrains from performing both the display process and the selection process.

6. The information terminal apparatus according to claim 1, wherein the information processing apparatus includes a communication processor that serves as the connection base.

7. The information terminal apparatus according to claim 6, wherein the connection base comprises any of the communication processor of the information processing apparatus and a private network.

8. The information terminal apparatus according to claim 1, further comprising
    a second transmitter that attaches the limitation information to the data of the data process, and transmits, to an external server, the data of the data process attached with the limitation information, wherein the controller causes, when the connectable base is detected and the information processing apparatus is searched by the base detector, the information processing apparatus connected to the connectable base to perform acquisition of the data of the data process from the external server, the controller causing the information processing apparatus to perform the acquisition of the data of the data process to thereby cause the information processing apparatus connected to the connectable base to perform a process based on the limitation information, the data process being caused, by the processing executing circuitry, to be executed.

9. The information terminal apparatus according to claim 8, wherein
the information processing apparatus comprises a plurality of information processing apparatuses,
the information processing apparatuses are connected to at least one of the connection bases, and
the controller causes, when the plurality of information processing apparatuses include the information processing apparatus that is unable to acquire the data of the data process from the external server, the information processing apparatus, of the plurality of information processing apparatuses, that is able to acquire the data of the data process from the external server to acquire the data of the data process from the external server.

10. The information terminal apparatus according to claim 8, wherein
the information processing apparatus comprises a plurality of information processing apparatuses,
the information processing apparatuses are connected to at least one of the connection bases, and
the controller performs a confirmation process on each of the information processing apparatuses, and performs a process that displays a result of the confirmation process, the confirmation process confirming whether each of the information processing apparatuses is able to acquire the data of the data process from the external server.

11. The information terminal apparatus according to claim 1, wherein
the information processing apparatus includes a printing unit,
the data of the data process includes print data, and
the limiting information includes information regarding a printing process.

12. An information terminal apparatus comprising:
an associating processor that associates each of connection bases with both base identification information and limitation information regarding a data process, the base identification information identifying corresponding one of the connection bases;
a process execution circuitry that causes an information processing apparatus to execute the data process, the information processing apparatus being connected to at least one of the connection bases;
a base detector that detects that any of the connection bases becomes a connectable base;
a transmitter that attaches the limitation information to data of the data process, and transmits, to an external server, the data of the data process attached with the limitation information; and
a controller that causes, when the connectable base is detected by the base detector, the information processing apparatus connected to the connectable base to perform acquisition of the data of the data process from the external server, the controller causing the information processing apparatus to perform the acquisition of the data of the data process to thereby cause the information processing apparatus connected to the connectable base to perform a process based on the limitation information, the data process being caused, by the processing executing circuitry, to be executed, wherein
the information processing apparatus comprises a plurality of information processing apparatuses,
the information processing apparatuses are connected to at least one of the connection bases,
the information processing apparatuses include one or more first information processing apparatuses and one or more second information processing apparatuses, the one or more first information processing apparatuses each being unable to acquire the data of the data process from the external server, the one or more second information processing apparatuses each being able to acquire the data of the data process from the external server, and
the controller causes any of the one or more second information processing apparatuses to acquire the data of the data process from the external server in place of any of the one or more first information processing apparatuses, and causes the data of the data process acquired by any of the one or more second information processing apparatuses to be transmitted to any of the one or more first information processing apparatuses.

13. An information processing system comprising:
an information processing apparatus; and
an information terminal apparatus that causes the information processing apparatus to perform a data process,
the information terminal apparatus including
an associating processor that associates each of connection bases with both base identification information and limitation information regarding the data process, the base identification information identifying corresponding one of the connection bases,
a process execution circuitry that causes the information processing apparatus to execute the data process, the information processing apparatus being connected to at least one of the connection bases,
a transmission reservation circuitry that makes a transmission reservation of data of the data process;
a base detector that starts, when the transmission reservation of the data is made by the transmission reservation circuitry, a detection as to whether any of the connection bases becomes a connectable base, and determines, when the connectable base is detected and on a basis of the limitation information, whether to search the information processing apparatus that is connected to the detected connectable base, and
a controller that causes, when the connectable base is detected and the information processing apparatus is searched by the base detector, the information processing apparatus connected to the connectable base to perform the data process based on the limitation information.

14. An information processing method comprising:
causing an information terminal apparatus to associate each of connection bases with both base identification information and limitation information regarding a data process, the base identification information identifying corresponding one of the connection bases;
causing the information terminal apparatus to make a transmission reservation of data of the data process;

causing the information terminal apparatus to start, when the transmission reservation of the data is made, a detection as to whether any of the connection bases becomes a connectable base, and determine, when the connectable base is detected and on a basis of the limitation information, whether to search the information processing apparatus that is connected to the detected connectable base;

causing the information terminal apparatus to suspend the data process which is caused to be executed by an information processing apparatus, the information processing apparatus being connected to at least one of the connection bases; and causing, when the connectable base is detected and the information processing apparatus is searched, the information processing apparatus connected to the connectable base to perform the data process based on the limitation information.

\* \* \* \* \*